(12) United States Patent
Yamada et al.

(10) Patent No.: US 9,569,613 B2
(45) Date of Patent: Feb. 14, 2017

(54) TECHNIQUES FOR ENFORCING CONTROL FLOW INTEGRITY USING BINARY TRANSLATION

(71) Applicant: INTEL CORPORATION, Santa Clara, CA (US)

(72) Inventors: Koichi Yamada, Los Gatos, CA (US); Palanivelrajan Shanmugavelayutham, San Jose, CA (US); Sravani Konda, San Jose, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/581,871

(22) Filed: Dec. 23, 2014

(65) Prior Publication Data

US 2016/0179546 A1 Jun. 23, 2016

(51) Int. Cl.
*G06F 21/00* (2013.01)
*G06F 21/54* (2013.01)
*G06F 9/44* (2006.01)

(52) U.S. Cl.
CPC ................ *G06F 21/54* (2013.01); *G06F 8/30* (2013.01)

(58) Field of Classification Search
CPC .... G06F 9/3804; G06F 9/30058; G06F 21/54; G06F 8/30
USPC ........... 726/22; 713/164, 176, 167, 187, 189
See application file for complete search history.

(56) References Cited

U.S. PATENT DOCUMENTS

| | | | | |
|---|---|---|---|---|
| 4,691,277 A * | 9/1987 | Kronstadt | ............. | G06F 9/3806 711/213 |
| 5,142,634 A * | 8/1992 | Fite | ............. | G06F 9/3844 712/237 |
| 5,237,666 A * | 8/1993 | Suzuki | ............. | G06F 9/30021 712/240 |
| 5,732,254 A * | 3/1998 | Tanimoto | ............. | G06F 9/3861 712/240 |
| 5,953,530 A * | 9/1999 | Rishi | ............. | G06F 11/3636 714/38.13 |
| 6,356,997 B1 * | 3/2002 | Krishnan | ............. | G06F 9/30058 703/26 |
| 6,530,016 B1 * | 3/2003 | Ukai | ............. | G06F 9/30054 712/237 |
| 6,707,463 B1 * | 3/2004 | Gibson | ............. | G06F 9/3879 345/501 |
| 7,546,587 B2 * | 6/2009 | Marr | ............. | G06F 21/10 717/124 |
| 8,935,781 B1 * | 1/2015 | Muth | ............. | G06F 21/74 726/22 |
| 9,129,062 B1 * | 9/2015 | Adams | ............. | G06F 11/3644 |
| 9,213,551 B2 * | 12/2015 | Shah | ............. | G06F 9/3851 |
| 2004/0133777 A1 * | 7/2004 | Kiriansky | ............. | G06F 21/554 713/166 |
| 2005/0010804 A1 * | 1/2005 | Bruening | ............. | G06F 21/52 726/1 |
| 2005/0108562 A1 * | 5/2005 | Khazan | ............. | G06F 11/3604 726/23 |
| 2005/0198645 A1 * | 9/2005 | Marr | ............. | G06F 21/606 719/310 |
| 2005/0257033 A1 * | 11/2005 | Elias | ............. | G06F 9/30058 712/236 |
| 2006/0026410 A1 * | 2/2006 | Yokoi | ............. | G06F 9/30054 712/240 |
| 2006/0095895 A1 * | 5/2006 | K. | ............. | G06F 11/28 717/130 |
| 2006/0294346 A1 * | 12/2006 | Stempel | ............. | G06F 9/3806 712/242 |
| 2007/0113291 A1 * | 5/2007 | Dai | ............. | G06F 21/629 726/27 |
| 2007/0220337 A1 * | 9/2007 | Itoh | ............. | G06F 21/75 714/30 |
| 2008/0256346 A1 * | 10/2008 | Lee | ............. | G06F 9/322 712/239 |

(Continued)

*Primary Examiner* — David Garcia Cervetti

(57) ABSTRACT

Various embodiments are generally directed to an apparatus, method and other techniques to determine a valid target address for a branch instruction from information stored in a relocation table, a linkage table, or both, the relocation table and the linkage table associated with a binary file and store the valid target address in a table in memory, the valid target address to validate a target address for a translated portion of a routine of the binary file.

27 Claims, 16 Drawing Sheets

(56) References Cited

U.S. PATENT DOCUMENTS

| | | | |
|---|---|---|---|
| 2009/0222646 A1* | 9/2009 | Ohba | G06F 11/3636 712/227 |
| 2010/0192026 A1* | 7/2010 | Abadi | G06F 11/08 714/53 |
| 2013/0160121 A1* | 6/2013 | Yazdani | G06F 21/54 726/23 |
| 2014/0359765 A1* | 12/2014 | Chen | G06F 21/51 726/22 |
| 2015/0007142 A1* | 1/2015 | Biffle | G06F 21/53 717/126 |
| 2015/0095628 A1* | 4/2015 | Yamada | G06F 21/54 712/234 |
| 2015/0106588 A1* | 4/2015 | Godard | G06F 12/0893 711/221 |
| 2015/0356294 A1* | 12/2015 | Tan | G06F 8/427 726/22 |
| 2015/0370560 A1* | 12/2015 | Tan | G06F 9/30058 717/148 |
| 2016/0092674 A1* | 3/2016 | Hughes | G06F 21/52 726/22 |
| 2016/0092675 A1* | 3/2016 | Vidrine | G06F 21/52 726/22 |
| 2016/0094552 A1* | 3/2016 | Durham | G06F 21/52 713/171 |

\* cited by examiner

1000

TRANSLATE A PORTION OF A ROUTINE INTO A TRANSLATED PORTION OF THE ROUTINE
*1005*

DETERMINE WHETHER AN INSTRUCTION OF THE ROUTINE IS A STACK MODIFICATION INSTRUCTION
*1010*

EMBED A STACK BOUNDARY VERIFICATION INSTRUCTION AFTER THE STACK MODIFICATION INSTRUCTION IN THE TRANSLATED PORTION OF THE ROUTINE
*1015*

*FIG. 10*

TECHNIQUES FOR ENFORCING CONTROL FLOW INTEGRITY USING BINARY TRANSLATION

TECHNICAL FIELD

Embodiments described herein generally relate to techniques detecting malware and virus attacks against computing systems by validating instructions.

BACKGROUND

Computer exploits are techniques which may be used to compromise the security of a computer system or data. Such exploits may take advantage of a vulnerability of a computer system in order to cause unintended or unanticipated behavior to occur on the computer system. For example, during a Jump-Oriented Programming (JOP) attack and a Return-Oriented Programming (ROP) attack a series of snippets of code that are already available in executable memory (e.g., portions of existing library code), and which are followed by a return instruction (e.g., a RET instruction) may be chained together into a desired execution sequence by pushing a series of pointer values onto the call stack and then tricking the code into executing the first pointer value. This chained execution sequence does not follow the intended program execution order that the original program author intended, but may instead follow an alternative execution sequence. In this manner, an attacker may create a virtual program sequence without requiring injection of external code.

BRIEF DESCRIPTION OF THE DRAWINGS

FIG. 10 illustrates an embodiment of a second logic flow diagram.

DETAILED DESCRIPTION

Figure 1:
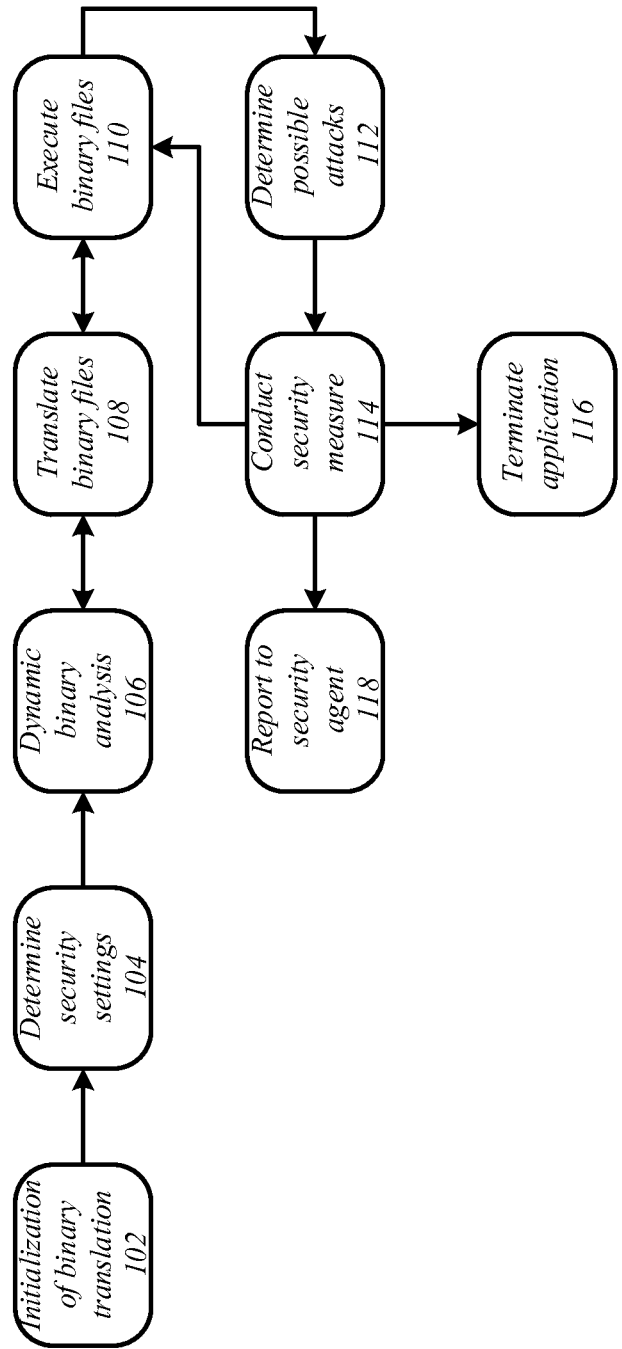
FIG. 1 illustrates an embodiment of a processing flow diagram.

Various embodiments are generally directed to an apparatus, system and method to detect various types of code reuse attacks including return-oriented programming (ROP) attacks, jump-oriented programming (JOP) attacks, and stack modification attacks. More specifically, valid target addresses for branch instructions may be determined prior to or during execution of instructions for applications and used for validation to ensure proper flow of execution. The valid target addresses may be determined and stored in one or more fast lookup tables that may be used during the execution of the instruction to validate whether the instruction is directing the flow of execution to a proper or valid target address so that the next instruction may be executed. One of the hallmarks of an ROP attack or an JOP attack is to insert a target address for a return instruction or jump instruction directing the flow of execution outside the normal scope of the application instructions so that an attack may take over the flow of execution.

The valid target addresses may be determined by a discovery routine, prior to the execution of the application instructions and associated library instruction based on information stored in one or more tables. For example, a discovery routine may analyze instructions, determine whether an instruction is a candidate for use during an attack and determine valid target addresses for the instruction based on information in a relocation table and/or a linkage table. Moreover, the discovery routine may be executed or run prior to execution of the application and the valid target addresses may be retrieved from the tables stored in persistent storage, for example. The valid target addresses may be stored in cache, in a fast lookup table, and accessed during run-time of the application to validate target addresses of branch instructions. These and other details will become more apparent in the follow discussion.

Further and in some embodiments, the stack modification instructions may be validated during execution of the instructions based on determined valid stack boundaries. For example, an instruction such as a stack boundary verification instruction may be placed in a translated portion of execution instruction after the stack modification instruction or block boundary. The stack boundary verification instruction may initiate a check to determine whether the stack modification instruction is directing the flow of execution outside of the valid stack boundaries for the application. Various embodiments are not limited in this manner and other details will become more apparent in the follow description.

Moreover, various embodiments also relate to an apparatus or systems for performing these operations. This apparatus may be specially constructed for the required purpose or it may include a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates an embodiment of a processing flow diagram 100 to ensure control flow integrity while processing instruction for an application. Various embodiments may be directed to detecting various types of malicious attacks and malware. For example, one or more embodiments may be directed to detecting a return oriented programming (ROP) attack, a jump oriented programming (JOP), a stack overflow attack and so forth. These attacks may be detected by performing a binary translation of one or more instructions for an application and libraries supporting the application. Prior to and during the binary translation valid target addresses for branch instructions may be determined, the target addresses may be validated during execution of an application, and stack modification instructions may be checked to ensure that they stay in predetermined or determined acceptable stack boundaries. These and other details will become more apparent in the following description.

At block 102, a binary translation may be initialized by injecting or inserting binary translation procedures, routines, protocols and so forth into an application to translate and store in translation cache. For example, one more software libraries associated with binary translation may be loaded into an application. The binary translation procedures, protocols, and so froth may be injected into the application by a security agent, such as an anti-virus software application or by a user input. The application may be any type of application, including but not limited to a word processing application, a spreadsheet application, an office application, a database application, a portable document format application, an operating system application, a utility application, a gaming application, a chat client application, an internet application including a browser, and so forth. Various embodiments are not limited in this manner.

In various embodiments and at block 104, security settings may be determined for the application and the computing system in which the application is operating on. The security settings may be determined by the binary translation procedures and routines or may be received from the software agent. In some embodiments, the security settings may be determined by a user, or a may be a default settings. Further, the security settings may be based on the type of application and the security risk the application imposes on the computing system. For example an application that is frequently subject to an attack may have a high level of security enabled, while other applications may have a lower level of security enabled. The level of security may be used to determine various other settings and configurations. For example, the level of security may be used to determine how many possible attacks are detected before a security measure is initiated.

Processing flow 100 may include performing a dynamic binary analysis on a main routine including execution instructions and one or more libraries for the application at block 106. During the dynamic binary analysis, a discovery routine may be executed to determine and predict valid target addresses for branch instruction, and in particular, indirect branch instructions. Branch instructions are generally categorized as direct or indirect branch instructions depending on the manner in which they specify their targets. Generally, direct branch instructions specify their targets with an offset or other indication of their targets directly embedded within them that enables the target addresses of their targets to be directly calculated once the address at which the routine is stored in a storage for execution is known. Direct branch instructions generally direct the flow of execution towards another portion of the same routine in which they exist. Generally, indirect branch instructions specify their targets with an identifier (e.g., a name of function routine, etc.) or by specifying that the target is the one at whatever address is stored in a register or variable at the time the branch instruction is executed. Indirect branch instructions may direct the flow of execution towards another portion of the same routine in which they exist, but are generally used to direct the flow of execution towards a different routine (e.g., a function routine of a library). Thus, the target address of a target of an indirect branch instruction cannot simply be calculated based on the address at which the routine is stored in a storage for execution. Instead, either a table matching target identifiers to target addresses must be used, or at least a portion of the routine preceding the branch instruction must be executed in order to derive the target address to determine what the target address is.

The discovery routine may predict valid target addresses for the branch instructions by analyzing one or more binary files of a main routine for the application and the libraries associated with executing the application. The binary files may be analyzed prior to execution of the application and translation of the execution instructions. Further, the binary files may be analyzed while stored on a persistent storage device, such as a hard drive (HDD), a solid state drive (SSD), a hybrid hard drive (HHD), a tape drive, and so forth, and prior to being translated and/or loaded into volatile memory such as random access memory (RAM), cache, and so forth.

In various embodiments, each of the binary files including a main routine, supporting routines and libraries may include one or more tables used by an operating system loader to identify target addresses. For example, each of the routines and libraries may include or be associated with a relocation table and a linkage table. Generally, during execution of the application, an operating system loader may use these tables to identify addresses and locations for various instructions when relocating instruction and identify links between routines and libraries. The discovery routine may exploit the information in the tables to identify or predict target addresses for the instructions and insert them into one or more lookup tables, such as a fast lookup table.

More specifically, a relocation table may store information used to relocate executable objects and instructions of binary files and libraries. For example, a relocation table may include a pointer for addresses and offsets of targets of indirect branch instructions and data structures used by an operating system loader to relocate the instruction to a virtual address. Thus, these pointers in the relocation table may be used by a discovery routine to predict valid target addresses for the indirect branch instructions which may then be stored in cache memory, and in particular, a lookup table. As will be discussed, the predicted target addresses may be used to validate target addresses of indirect branch instructions during execution or run-time of the application.

A linkage table may store information used to export and import dynamic-link library (DLL) address information to perform dynamic linking of a library. For example, export information of a DLL may include application programming interface (API) and function addresses that may be used by executable instructions to determine target addresses. In another example, the import information of a DLL may include external API and function addresses that are imported from other DLLs, allows procedures and functions to access the APIs and can be used to determine target addresses. In some embodiments, the linkage table may be used by the discovery routine to determine or predict target addresses for calls made to external DLL APIs. The predicted target addresses may be stored in a lookup table for validation during execution of the application.

At block 108, a translation routine may be executed and the binary files including the main routine, other routines including sub-routines, and libraries may be translated. In some embodiments, a translation routine may execute or operate independently of a discovery routine. For example, in some embodiments are discovery routine may not be executed prior to the execution of a translation routine. Valid target addresses may be determined during the execution of the translation routine.

In executing a translation routine, portions of a main routine, other routines and libraries of the application may be translated into a translated routines and translated libraries stored in in a cache memory for execution. During translation one or more target addresses of branch instructions may be derived or determined. In some embodiments, these target addresses derived may be ones that could not be determined by the discovery routine. For example, target addresses for one or more instructions not stored in a relocation table or linkage table may be determined during the translation routine. However, various embodiments are not limited in this manner and all, none or some of the target addresses may be determined during a discovery routine.

When target addresses are determined during the translation routine, they may be stored in cache memory for direct branch instructions and in a lookup table for indirect branch instructions. More specifically and for at least some indirect branch instructions that incorporate an identifier of their intended targets, the translation routine attempts to determine their target addresses by using those identifiers to refer to an entry point table. This may be done in embodiments in which one or more libraries are accompanied by such entry point tables. Each sequence of instructions that implements a function routine within a library has what is commonly referred to as an "entry point" at which there is an instruction at which the execution of that function routine is meant to begin, and at which execution normally does begin, and therefore, can be used to determine valid target addresses.

The translation routine may also use identifiers incorporated into indirect branch instructions to retrieve indications of target addresses known to be valid from one or more alternate or additional tables such as a white list table. A white list table may be generated or determined based on content of libraries that tend to change only infrequently over time such that it becomes feasible to construct a viable whitelist of valid target addresses for valid entry points of the function routines to which a branch instruction may validly jump.

Where the translation routine is able to retrieve a valid target address from and entry point table, a white list table or another table, the valid target addresses may be stored in one or more lookup tables. In some instances, the lookup tables may be the same as the lookup tables used above during the discovery routine. It should be noted that the one or more lookup tables may be implemented as any of a variety of types of data structures in which indications of valid target addresses may be stored in any of a variety of formats. In some embodiments, the lookup tables may be fast lookup tables.

As the translation routine translates portions of the main routine, other routines and the libraries indirect branch instructions may be replaced with a stub instruction that causes the flow of execution of the application to be directed back to the translation routine during execution. More specifically, a stub instruction returns control of the flow of execution to the translation routine to enable the translation routine to check whether the target address to which that indirect branch instruction attempts to jump matches any of the known valid target addresses stored in the one or more lookup tables. Presuming that there has not been an ROP attack, a JOP attack, stack overflow or other malicious action during execution of a translated portion of whatever routine was placed in the cache up to that stub instruction, there should be a match for the target address of the target to which the indirect branch instruction would direct the flow of execution. Upon determining that there is a match, the translation routine permits that indirect branch instruction to be executed. Different types of stub instruction are substituted for different types of indirect branch instruction. Thus, a different type of stub instruction may be associated with each of indirect jump instructions, call instructions and return instructions. In some embodiments, there may also be a type of stub instruction that is inserted at the end of a translated portion of a routine placed in the cache to serve as a signal to the translation routine that more of that routine needs to be translated and placed in the cache to enable execution of that routine to continue.

However, if the target address derived during execution of the translated portion of whatever routine that was placed in the cache has been somehow modified since that portion was translated and placed in the cache, then there will not be a match for the target address of the target to which that indirect branch instruction would direct the flow of execution with any of the valid target addresses in the one or more lookup tables. In various embodiments, this lack of there being a match may be deemed an indication of a ROP attack, JOP attack, or another type of attack and the translation routine may take one or more possible actions in response, those actions possibly specified in policy data based on the security setting determined at block 104.

Among those actions may be to attempt to find a match for the target address derived during execution among the valid target addresses in one or more entry point tables or whitelist table. This may be done in response to the possibility that one or both of these tables are dynamic in nature such that their listings of target addresses known to be valid may change over time. Also among the possible actions may simply be to terminate execution of whatever routine that branch instruction belongs to. Another possible action is to signal a security routine to analyze the suspect routine to determine whether it is deemed safe to allow it to continue to be executed in spite of the lack of a matching valid target address in the one or more lookup tables such that the branch instruction is allowed to be executed. This latter possible action may be taken in recognition of the fact that some legitimate routines that are executed properly and are not a security threat may perform actions that do bring about an instance of deriving a target address during execution that is not a match for any of the valid target addresses. For example, a number of false positive detections may be permitted before a security measure is initiated.

In some embodiments, valid target addresses for specific instruction may be derived. For example, where an indirect branch instruction is a "call" instruction (e.g., a call from a portion of a routine, the translation routine may derive a known valid target address for the return instruction corresponding to that call instruction, and store the valid target address for the return instruction in a lookup table. Then, when the stub instruction associated with a return instruction expected to be associated with that call instruction is executed, the translation routine checks whether the target address of the target to which the return instruction seeks to direct the flow of execution matches the valid target address stored in the lookup table. This ensures that the target address of that return instruction derived during execution has not been modified to cause the flow of execution to jump to an illegitimate target address. A hallmark of ROP attacks is to modify the target addresses of return instructions as part of causing execution to jump among pieces of legitimate code to perform a malicious function.

The translation routine may also embed or insert a stack boundary verification instruction after each stack modification instruction in the translated portions of the routines and libraries in cache to protect against a stack pivot attack. A hallmark of a stack pivot attack is to change where a stack pointer is pointing to an attacker "owned" buffer, such as a heap so that an attack may be carried out. When a value or a stack pointer changes for a stack modification instruction during an attack it will likely point to a location outside a predetermined or determined valid stack boundaries.

A stack modification instruction may be any type of instruction that modifies a stack, such as an exchange (XCHG) instruction, a pop (POP) instruction, a leave instruction, a move (MOV) instruction, and so forth, and may be in one or more routines and libraries including a main routine, sub-routines and other routines. The translation routine may detect a stack modification instruction during translation and insert or embed a check or a stack boundary verification instruction after the translated stack modification instruction in cache. A stack boundary verification instruction may check and verify that the stack modification is not modifying a stack pointer outside of determined valid stack boundaries. The valid stack boundaries may be determined by the translation routine and set by an operating system when setting up stacks for the application. Moreover, the stack boundary verification instruction may compare a value of the stack pointer against the stack boundary which may be coarse-grain as those setup by the operating system or fine-tuned to a finer range by the application.

As the embedded checks are done right after the stack modification instructions, detection of an attack may be immediate. If the translation routine determines that the stack modification instruction modifies a stack pointer outside of the valid stack boundaries, one or more security measures may be initiated. The security measures may include killing the routine, quarantining the routine, reporting the possible attack to a software agent, and so forth. The security measure initiated may be based on the security setting determined at block 104. Various embodiments are not limited in this manner and other security measures may be taken.

At block 110, the translated binary files may be executed by a processing component, for example. The translated binary files can be from a cache memory and may be executed based on the flow of the routines and libraries and on interactions a user may have with an application. When executing, branch instructions and stack modification instructions may be validated. More specifically, target addresses for direct branch instructions may be validated in the cache memory and target addresses for indirect branch may be validated based on a comparison with known valid target addresses stored in a lookup table. During execution of an indirect branch instruction a stub instruction may be encountered and control may be returned to a translation routine to validate a target address for the instruction. Once validated, the instruction may be permitted to be executed. Each stack modification may also be validated based on whether, a stack modification instruction includes a value or pointer that points to a location outside of valid stack boundaries.

In some embodiments, the translation of the binary files that occurs at block 108 and the execution of the translated binary files that occurs at block 110 may occur dynamically during execution of an application. In other words, all of the routines and libraries for an application do not need to be translated prior to the initiation of the execution of the application. The application may be initiated, and translations of various instructions for routines and libraries may occur in real-time and on an as needed basis. Various embodiments are not limited in this manner and in some embodiments all of the routines and libraries may be translated prior to execution of the application.

During execution of the routine, a possible attack may be detected at block 112. For example, a target address for a branch instruction may be invalid or different than any known valid target address, or a stack modification instruction may include a pointer or value that points to a location outside of valid stack boundaries. For example, stack modification instruction may include a value that points to a stack controlled by an attacker during a stack pivot attack.

At block 114, one or more security measurements may be initiated and conducted when a possible attack is detected. On the other hand when an application is operating normally and an attack is not detected blocks 108 and 110 may occur dynamically, as previously discussed. If a security measure does need to be initiated a number of actions may be taken which may be based on the security settings determined at block 104. For example, the execution of the binary files may be allowed to continue to be executed as indicated by the arrow pointing from block 114 to block 110. A number possible attack detections may be allowed before a security measure is initiated to prevent a security measure to occur during a false positive detection.

In some embodiments, when an attack is detected a security agent may be notified at block 118. A security agent may be any type of security software such as an anti-virus that may be capable of handling an attack. Once the security agent is notified that an attack may be occurring, the security agent may take additional security measures to prevent corruption of data, stolen information, malicious consequences and so forth. In some embodiments, the application including the routine may be terminated at block 116. Any number of security measures may be initiated to prevent unintended consequences from occurring due to an attack. Various embodiments are not limited in this manner.

Figure 2:
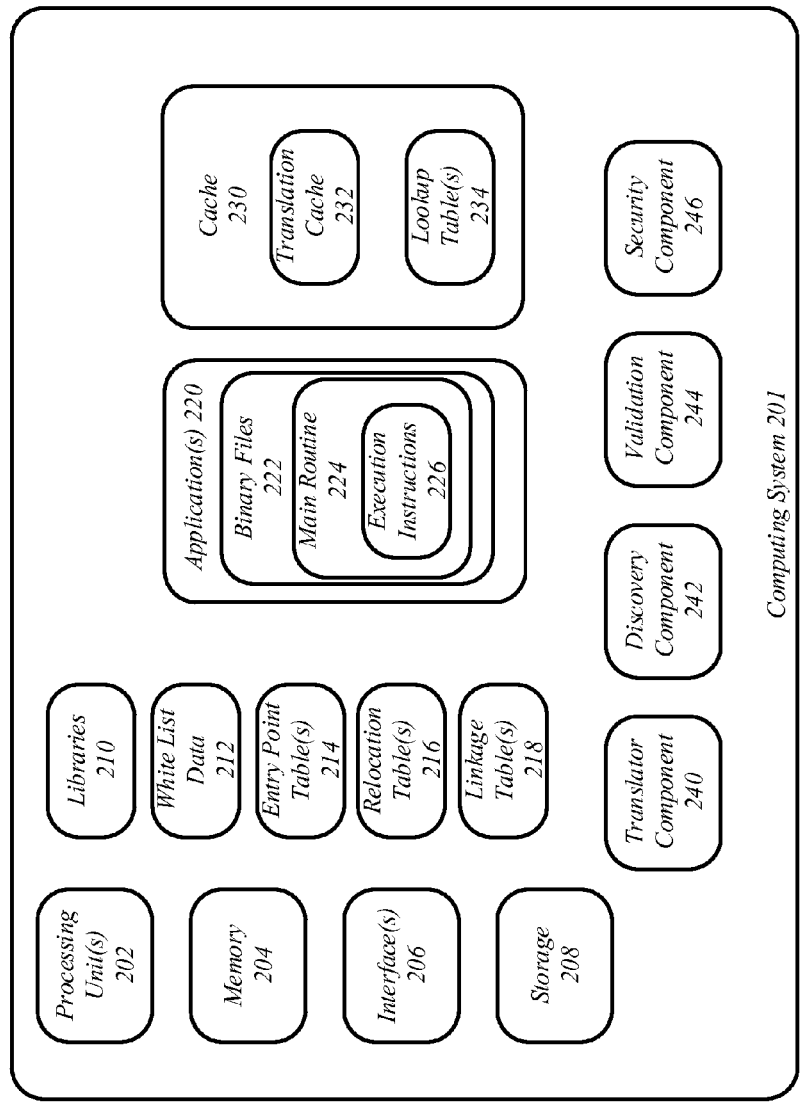
FIG. 2 illustrates an embodiment of a computing system.

FIG. 2 illustrates an embodiment of a computing device 201 to process information and data. In some embodiments, computing device 201 may include a number of components, modules and processing circuitry to detect and process return-oriented programming (ROP) attacks, jump-oriented programming (JOP) attacks, stack pivot attacks, and so forth by verifying target addresses of instructions and stack modification instructions during execution of an application.

Computing device 201 may include one or more processing units 202, memory 204, one or more interfaces 206 and storage 208. In some embodiments, the one or more processing units 202 may be one or more of any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit. The one or more processing units 202 may be connected to and communicate with the other elements of the computing device 201 via interconnects (now shown), such as one or more buses, control lines, and data lines. In some embodiments, the one or more processing units 202 may include processor registers or a small amount of storage available the processing units to store information including instructions that and can be accessed during execution. Moreover, processor registers are normally at the top of the memory hierarchy, and provide the fastest way to access data.

As mentioned, the computing device 201 may include memory 204 to store information. Further, memory 204 may be implemented using any machine-readable or computer-readable media capable of storing data, including both volatile and non-volatile memory. In some embodiments, the machine-readable or computer-readable medium may include a non-transitory medium. The embodiments are not limited in this context.

The memory 204 can store data momentarily, temporarily, or permanently. The memory 204 stores instructions and data for computing device 201. The memory 204 may also store temporary variables or other intermediate information while the one or more processing units 202 is executing instructions. In some embodiments, information and data may be loaded from memory 204 into the computing registers during processing of instructions. Manipulated data is then often stored back in memory 204, either by the same instruction or a subsequent one. The memory 204 is not limited to storing the above discussed data; the memory 204 may store any type of data. In some embodiments, the memory 204 may include cache, such as cache 230 including translation cache 232 and one or more lookup tables 234. The cache 230 may be used by the translation routine to store translated portions of one or more routines and libraries for execution. Further, the lookup tables 234 may be fast lookup tables and store valid target address.

The one or more interfaces 206 includes any device and circuitry for processing information or communications over wireless and wired connections. For example, the one or more interfaces 206 may include a receiver, a transmitter, one or more antennas, and one or more Ethernet connections. The specific design and implementation of the one or more interfaces 206 may be dependent upon the communications network in which the computing device 201 is intended to operate.

For example, the computing device 201 may include a communication interface designed to operate in GSM with General Packet Radio Service (GPRS) systems (GSM/GPRS), CDMA/1xRTT systems, Enhanced Data Rates for Global Evolution (EDGE) systems, Evolution Data Only or Evolution Data Optimized (EV-DO) systems, Evolution For Data and Voice (EV-DV) systems, High Speed Downlink Packet Access (HSDPA) systems, High Speed Uplink Packet Access (HSUPA), and so forth. data communications networks, and also designed to operate with any of a variety of voice communications networks, such as may include Code Division Multiple Access (CDMA) systems, Global System for Mobile Communications (GSM) systems, North American Digital Cellular (NADC) systems, Time Division Multiple Access (TDMA) systems, Extended-TDMA (E-TDMA) systems, Narrowband Advanced Mobile Phone Service (NAMPS) systems, third generation (3G) systems such as Wide-band CDMA (WCDMA), CDMA-2000, Universal Mobile Telephone System (UMTS) systems, and so forth. Other types of data and voice networks, both separate and integrated, may also be utilized with computing device 201. The computing device 201 may also be compliant with other communications standards such as 3GSM, 3GPP, UMTS, 4G, etc. In some embodiments, the computing device 201 may be designed to operate in a plurality of communications networks and is not limited to a specific network.

In various embodiments, the one or more interfaces 206 may include one or more I/O controllers (not shown) to output any signals and information. The I/O controller may enable communication over wireless and wired connections. In various embodiments, the I/O controller may be separate component or module of computing device 201.

Computing device 201 may include storage 208 which may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 208 may include technology to increase the storage performance enhanced protection for valuable digital media when multiple hard drives are included, for example. Further examples of storage 208 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

Further storage 208 may store a number of components and modules to process information and including a translator component 240, a discovery component 242, a validation component 244 and security component 246. Storage 208 may also include one or more libraries 210, white list data 212, an entry point table 214, one or more relocation tables 216 and one or more linkage tables 218. The storage 208 may also include one or more applications 220 that each include binary files 222 including a main routine 224 having execution instructions 226 that can be executed and process information and data. However various embodiments are not limited in this manner and in some embodiments one or more of the components, libraries, data, tables, applications, and so forth may be wholly or partly implemented in hardware.

In various embodiments, the computing system 201 may include any number of applications 220. Each of the applications 220 may including a number of binary files 222 including a main routine 224 which may incorporate a sequence of execution instructions 226 operative on the one or more processing units 202 in its role as a main processor component of the computing device 201 to implement logic to perform various functions. Further each of the routines including the main routine 224 may include or be associated with a number of tables including a relocation table 216 and linkage table 218. In other words, each routine of an application 220 may include a relocation table 216 and a linkage tables 218. However, various embodiments are not limited in this manner and in some embodiments, a relocation table 216 and a linkage table 218 may be shared among the various routines and libraries associated with an application 220. The relocation tables 216 and linkage tables 218 for each of the routines may be used by the discovery component executing a discovery routine to determine valid target addresses for instructions, as previously discussed.

The computing device 201 may include the discovery component 242 to perform a discovery routine to determine valid target addresses for instructions prior to translation of the instructions. The discovery routine may use one or more relocation tables 216 and one or more linkage tables 218 associated with the routines of an application 220 to determine valid target addresses by inspecting the binary files 222 and exploiting the information in the tables to identify or predict target addresses for the instructions. These valid target addresses may be stored in a lookup table 234 once determined during discovery routine for validation. Various embodiments are not limited to determine valid target addresses for binary files 222 and valid target addresses may also be determined for libraries 210 during the discovery routine. More specifically, each library 210 used by an application 220 for execution may also be associated with a relocation table 216 and a linkage table 218. These tables may also be used by a discovery routine to determine valid target addresses for instructions in the libraries and to store in lookup tables 234 for validation during execution of the instruction.

The relocation table 216 may store information used to relocate an executable object or instruction. For example, the relocation table 216 may include a pointer for addresses and offsets of targets of branch instructions and data structures used by an operating system loader to relocate the instruction to a virtual address. Thus, these pointers in the relocation table may be used by the discovery routine to predict valid target addresses for the branch instructions which may then be stored in cache memory, and in particular, a lookup table 234. As will be discussed, the predicted target addresses may be used to validate target addresses of indirect branch instructions during execution or run-time of the application.

The linkage table 218 may store information used to export and import dynamic-link library (DLL) address information to perform dynamic linking of a library. For example, export information of a DLL may include application programming interface (API) and function addresses that may be used by executable instructions to determine target addresses. In another example, the import information of a DLL may include external API and function addresses that are imported from other DLLs, allows procedures and functions to access the APIs and can be used to determine target addresses. In some embodiments, the linkage table 218 may be used by the discovery routine to determine or predict target addresses for calls made to external DLL APIs. The predicted target addresses may be stored in the lookup table 234 for validation during execution of the application.

The computing device 201 may also include a translator component 240 to perform a translation routine or operations to translate portions of one or both of the main routine 224 and the libraries 210 which may be stored in a translation cache 132 for execution. During the translation routine, target addresses may also be determined or derived. These target addresses may be addresses not discoverable during the discovery routine. Further, the target addresses may also be stored in one or more lookup tables 234 for use during validation of an instruction while executing the instruction and application. The translator component 240 may determine valid target addresses for any execution instruction 226 for an application 220 and any library 210. In some embodiments, the translator component 240 may determine valid target addresses by using information in white list data 212 and entry point tables 214. For example, white list data 212 may include information indicate valid target addresses for instructions that change infrequently over time. Similarly, the entry point table 214 may also include valid target addresses for instructions of libraries 210, for example.

The translator component 240 may also translate portions of the routines and execution instructions for each of the binary files 222 and libraries 210 and store the translated portions in the translation cache 232. More specifically, during a translation routine a copy of an instruction from a binary file 222 or a library 210 may be stored in the translation cache 232 and may be used for execution instead of the original instruction. When translating a routine or library having an indirect branch instruction, a stub instruction may replace the indirect branch instruction to divert control of execution back to the translator component 240 and translation routine. Once the control is diverted back to the translator component 240, the target address may be validated based on a comparison between the intended target address of the instruction and the predicted valid target address in the one or more lookup tables 234.

In addition, the translator component 240 may translate stack modification instructions and embed a check or stack validation instruction after the stack modification instruction. During execution, the stack validation instruction is used to check whether the stack modification instruction includes a valid pointer or value within valid stack boundaries. In various embodiments, valid stack boundaries for stacks may be determined and stored in a table, such as a stack boundaries table, which may be used to validate stack modification instructions. For example, an operating system may define stack boundaries for a stack at creation time of the stack. The valid stack boundaries may be stored in a table and during execution of the translated stack modification instruction, the stack validation instruction may check a value of the modification instruction to ensure that it is within valid boundaries. If the stack modification instruction value is not within valid stack boundaries a security measure may be initiated and if the stack modification instruction value is within valid stack boundaries the execution of the application 220 may be allowed to proceed.

In some embodiments, the computing system 201 may also include a validation component 244. The validation component 244 may be used to validate target addresses and stack modification instructions. For example, the validation component 244 may receive an intended target address for an indirect branch instruction and make a comparison with a known or predicted valid target address to ensure that the intended target address is valid. If the intended target address is valid the indirect branch instruction may be allowed to execute. However, if the intended target address is not valid a security measure be initiated. In another example, the validation component 244 may receive information including a value for a stack modification instruction and determine whether the value is within valid stack boundaries. Similarly, if the value is within stack boundaries the execution of instructions may proceed. However, if the value is not within stack boundaries a security measure may be initiated.

The computing system 201 may also include a security component 246 to initiate and process one or more security measures. As previously discussed, if an attack is suspect a security measure may be invoked. For example, the security component 246 may kill the application 220 suspected in the attack. In another example, the security component 246 may only prohibit the instruction suspected in the attack from being executed, i.e. quarantining the instruction. In a third example, the security component 246 may permit the instruction to execute as long as one or more counters have not reached a threshold to limit false positives. In addition, the security component 246 may notify a security agent, such as an anti-virus program that a possible attack may be underway. Various embodiments are not limited to these examples and other security measures may be contemplated. Further, more than one security measure may be initiated by the security component 246.

FIGS. 3A-3E illustrate embodiments of a computing system 301 processing information during a discovery routine. As mentioned, a discovery routine may be executed by one or more components operable on processing circuitry on a computing system. In some embodiments, the computing system 301 may include a discovery component 242 to initiate and process the discovery routine. However various embodiments are not limited in this manner and other components, processing circuitry and so forth may process the discovery routine either partially or wholly. Further and as previously mentioned, the discovery component may be implemented in software only, hardware only, or combination thereof.

Figure 3A:
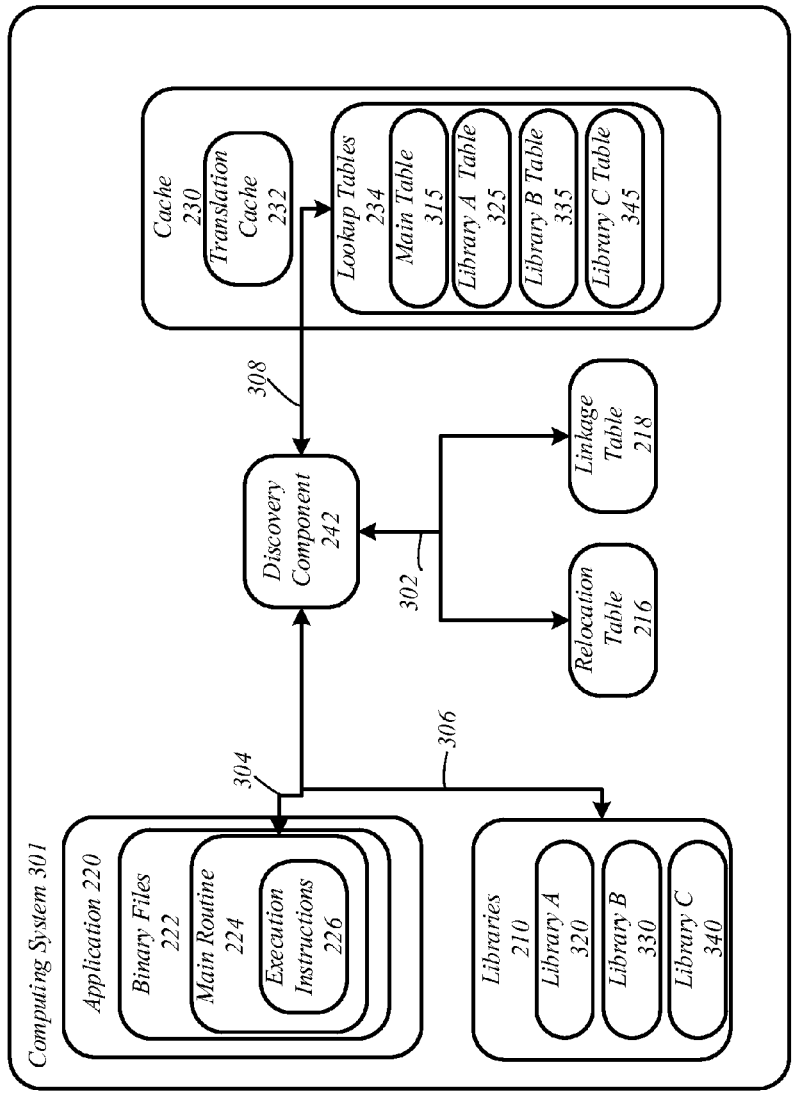
FIG. 3A-3E illustrate embodiments of computing systems for processing a discovery routine.

FIG. 3A illustrates a general overview of processing of the discovery routine by the discovery component 242. For example, at line 304, the discovery component 242 may retrieve or receive information from one or more binary files 222 including routines such as a main routine 224 of an application 220. In addition, the discovery component 242 may also retrieve or receive information from one or more files of libraries 210, such as library A 320, library B 330 and library C 340 at line 306. The information may include instructions for the binary files 222 and the libraries 210 which may have target addresses. For example, the binary files 222 and the libraries 210 may include branch instructions that have target addresses pointing to a location in memory for the next instruction to be executed. In some embodiments, the target addresses may be determined or derived from information in one or more tables, such as relocation table 216 and linkage table 218.

As previously mentioned, the relocation table 216 and linkage table 218 may include information used by an operating system to relocate instruction to virtual memory and to link libraries during runtime or execution of the application 220. Thus this information may be exploited by the discovery component 242 prior to execution of the application 220. For example and at line 302, the discovery component 242 may read information from the relocation table 216 or linkage table 218 for an instruction based on the information received from the binary files 222 and libraries 210 to determine valid target addresses. For example, if an instruction is a branch instruction of the main routine 224, the discovery component 242 may determine a valid target address for the instruction based on information in the relocation table 216. In another example, if the instruction is an instruction in one or the libraries 210, the discovery component 242 may determine a valid target address for the instruction based on information in the linkage table 218.

Once, the discovery component 242 determines a valid target address for an instruction it may send it or communicate it to a lookup table 234 at line 308. In some embodiments and as will be discussed with respect to FIGS. 3B through 3E, the valid target address may be stored in a lookup table corresponding to a location of the instruction.

Figure 3B:
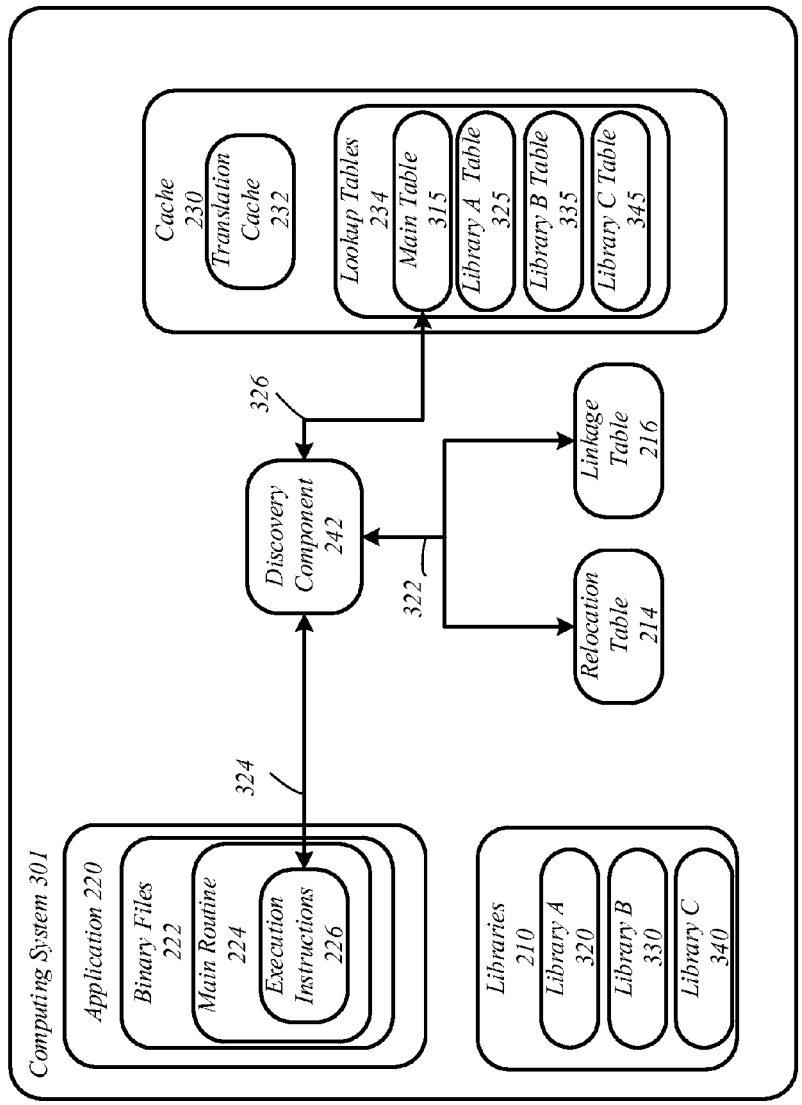

For example and as illustrated in FIG. 3B if the instruction is an execution instruction 226 of the main routine 224 at line 324, the discovery component 242 may determine a valid target address for the instruction at line 322 from information in either or both of the relocation table 214 and linkage table 216. The discovery component 242 can save the valid target address in one of the lookup tables 234, and in particular, main table 315 which corresponds with the main routine 224. In various embodiments, main table 315 may store every valid target address for the main routine 224 which may be accessed when validating a translated execution instruction.

Figure 3C:
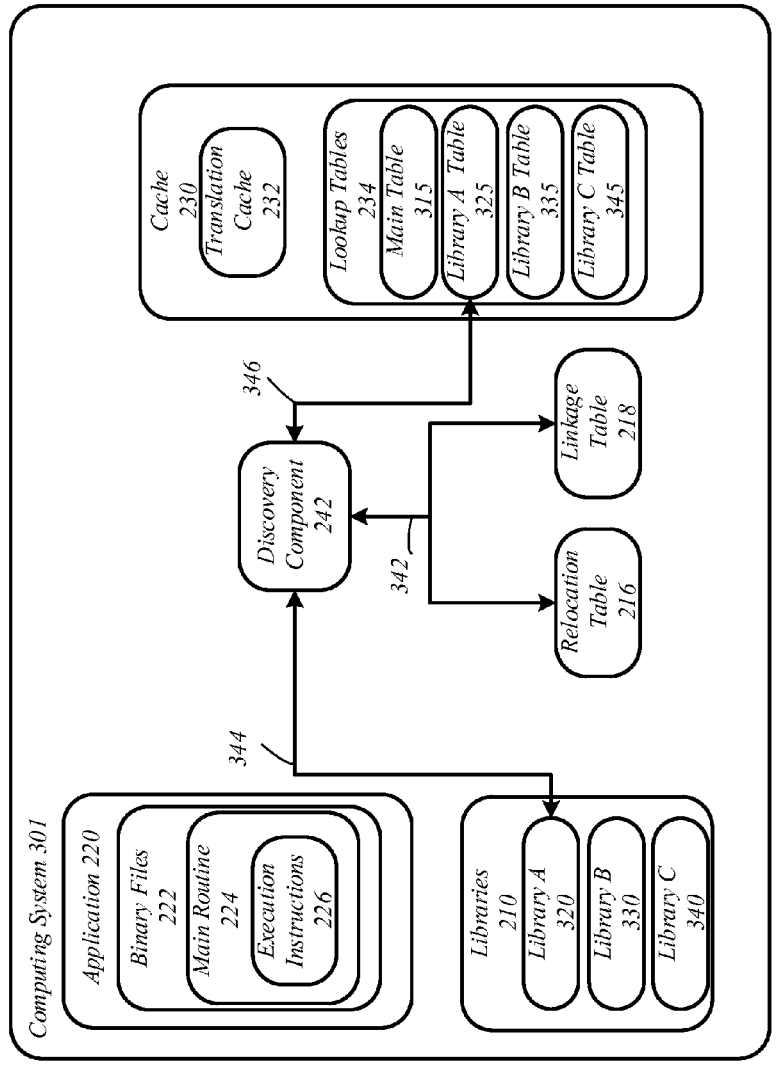
Figure 3D:
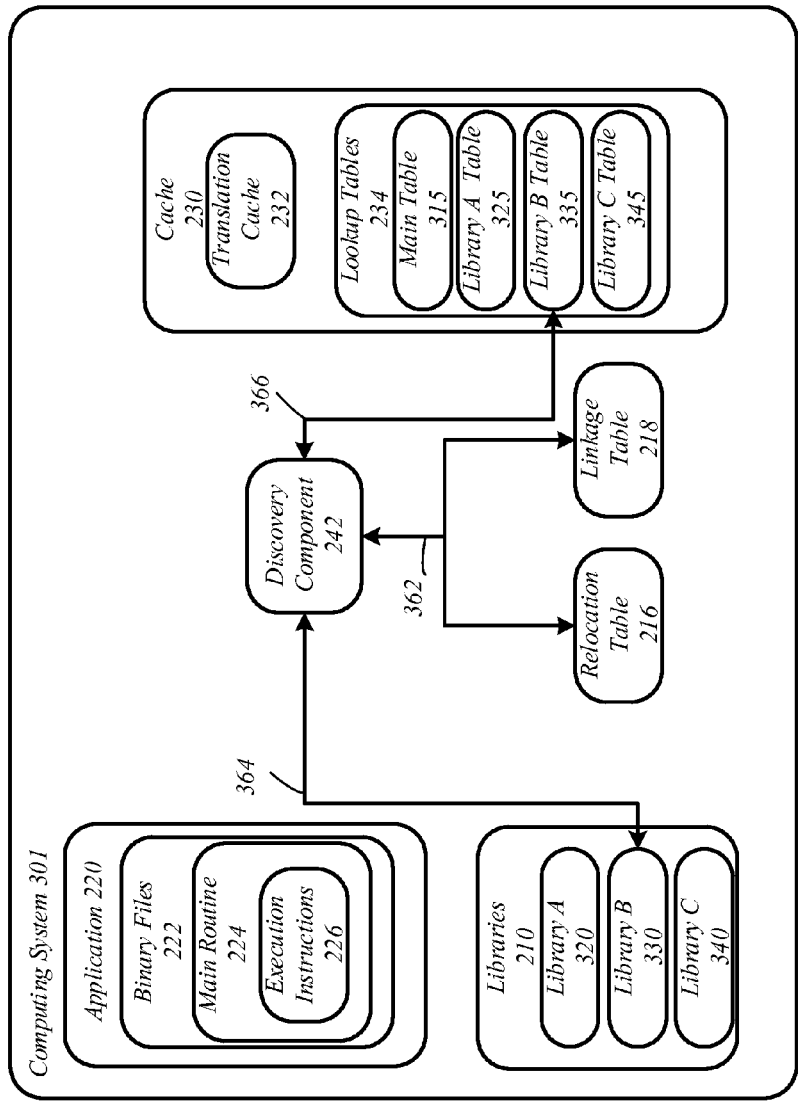
Figure 3E:
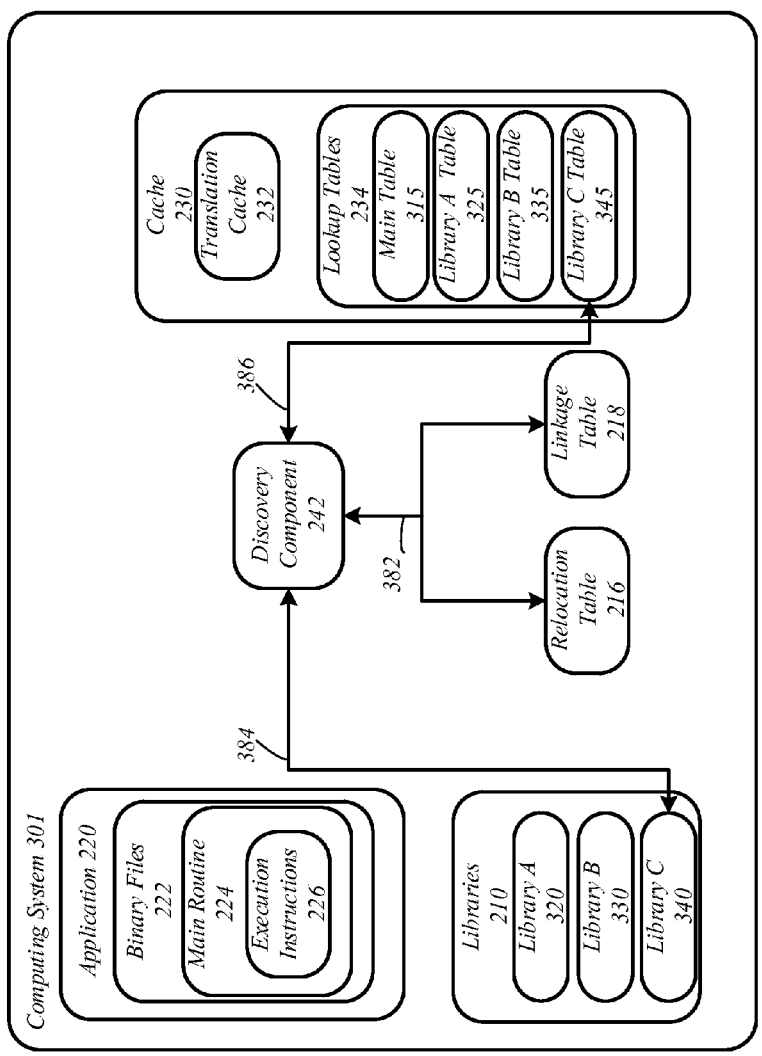

As illustrated in FIGS. 3C through 3E, each routine and library may have a corresponding table in cache 230. For example, FIG. 3C shows a valid target address for an instruction from library A 320 stored in a corresponding library A table 325 at line 346. Similarly, FIG. 3D illustrates a valid target address for an instruction of library B 330 store in a corresponding library C table at line 366 and FIG. 3E illustrates a valid target address for an instruction of library C 340 stored in corresponding library C table 345 at line 386. As mentioned, each routine and library may have a corresponding lookup table to store valid target addresses. This may decrease validation time when an intended target address is validated. For example, a validation component 244 may look in a particular lookup table when validating the translated instruction. The particular lookup table may have less valid target addresses than if all the valid target addresses were stored in a single lookup table. However, various embodiments are not limited in this manner, and in some embodiments valid target addresses may be stored in a single lookup table.

The discovery component 242 may determine valid target addresses for any number of instructions including direct and indirect branch instructions by performing a discovery routine. The discovery routine determines the valid target based on information stored in a relocation table 216 and a linkage table 218 of each of the binary files. As previously mentioned, each of the binary files 222 including those for an application 222 and those for libraries 210 may have a corresponding relocation table 216 and linkage 218. However in the same or other embodiments, one relocation table 216 and one linkage table 218 may be used for all of the binary files. Various embodiments are not limited in this manner. Further, the discovery routine may be executed prior to a translation routine of the instructions and may be based on information from a user via a user interface, or on a periodic basis. By executing the discovery routine prior to the translation routine which may be executing dynamically considerable processing cycles may be saved.

Figure 4:
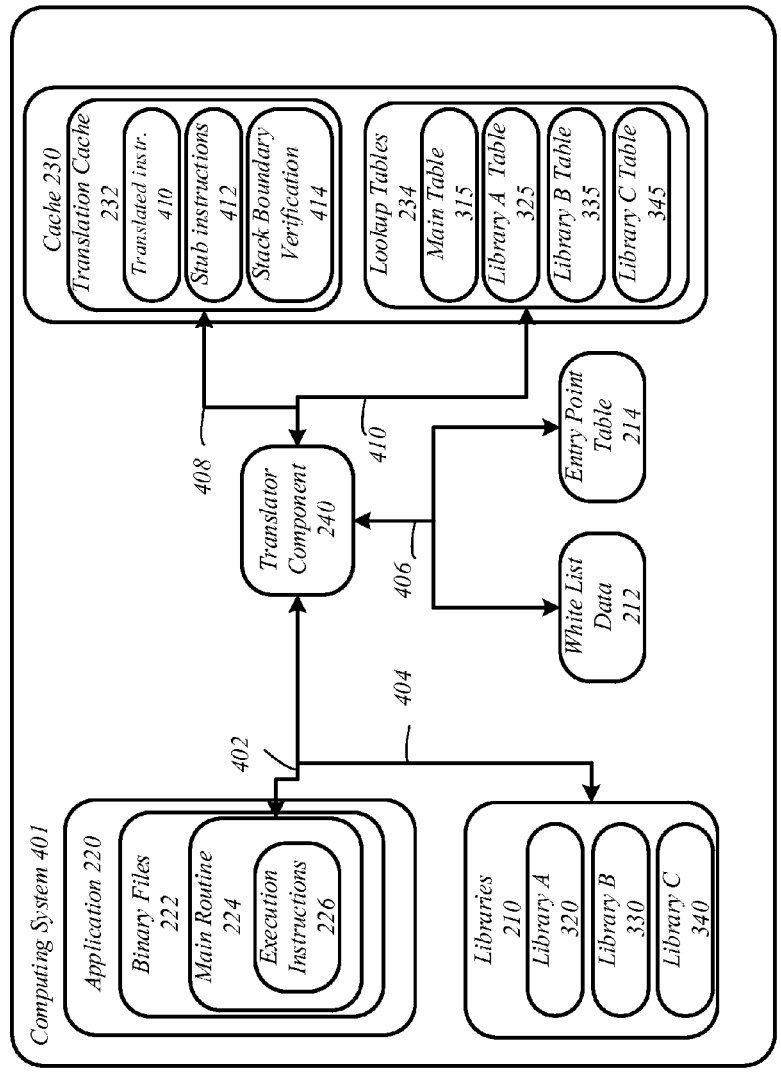
FIG. 4 illustrates an embodiment of a computing system for processing a transaction routine.

FIG. 4 illustrates an embodiment of a computing system 401 for processing a transaction routine. Although FIG. 4 illustrates computing system 401 with a limited number of components, applications, libraries and so forth, various embodiments are not limited in this manner. For example, computing system 401 may also include components, applications, libraries, tables and so forth, illustrated in computing system 201 in FIG. 2.

Various embodiments may include a translator component 240 in hardware only, software only, or combination thereof that may be operable or perform a translation routine for one or more applications, such as application 220. The translation routine may be executed or occur dynamically while an application 220 is be executed by the computing system 401, such as when a user is interacting with the application 220.

During the translation routine, various instructions may be translated and stored in cache 230, and in particular, a translation cache 410. The instructions may be translated such that they may be validated during execution to protect against various types of malware attacks. For example, at line 402 execution instructions 226 of the main routine 224 may be received or retrieve by the translator component 240 which may translate the instruction and store it in a translated instruction 410 portion of the translation cache 232. The translator component 240 can also determine whether the instruction is a branch instruction and if a valid target address has been determined for the branch instruction. If the instruction is a branch instruction, but a valid target address has not been determined, the translator component 240 can determine a valid target address by reading information from a whitelist data 212 and/or entry point table 214 at line 406.

The translator component 240 can store valid target addresses for instructions as illustrated by line 410 in a lookup table 234. In some embodiments, the translator component 240 may store the valid target address in a lookup table 234 corresponding to a routine or library in which the instruction is in, e.g. main table 315, library A table 325, library B table 335 or library C table 345.

Translator component 240 may also translate and determine valid target addresses for instruction of one or more libraries 210, such as Library A 320, Library B 330, or Library C 340 as illustrated by line 404. Valid target addresses for branch instructions in the libraries 210 may also be determined, if needed, and stored in a corresponding lookup table 234. For example, a valid target address for an instruction of library A 320 can be stored in library A table 325, a valid target address for an instruction of library B 330 can be stored in library B table 335 and a valid target address for an instruction of library C 340 can be store in library C table 345. As previously discussed, the translator component 240 may determine valid target addresses for instructions in the libraries 210 via information in one or both of the whitelist data 212 and entry point table 214.

In some embodiments, the translator component 240 may also insert stub instructions 412 in the translation cache 232 for indirect branch instruction, such that during execution of the indirect branch instruction control will be given back to the translator component 240 which can initiate a validation of the indirect branch indirection by a validation component 244. For example, when a stub instruction 412 is reached during execution, the translator component 240 sends an intended target address for the instruction to the validation component 244 which can be validated against information in one of the lookup tables 234.

The translator component 240 may also embed or add a stack boundary verification instruction 414 after each stack modification instruction in the translation cache 232. As will be discussed in more detail in FIG. 5, the stack boundary verification instruction 414 will be used to validate a stack modification instruction ensuring that it does not include a pointer or value outside of determined valid stack boundaries indicating a possible attack.

Figure 5:
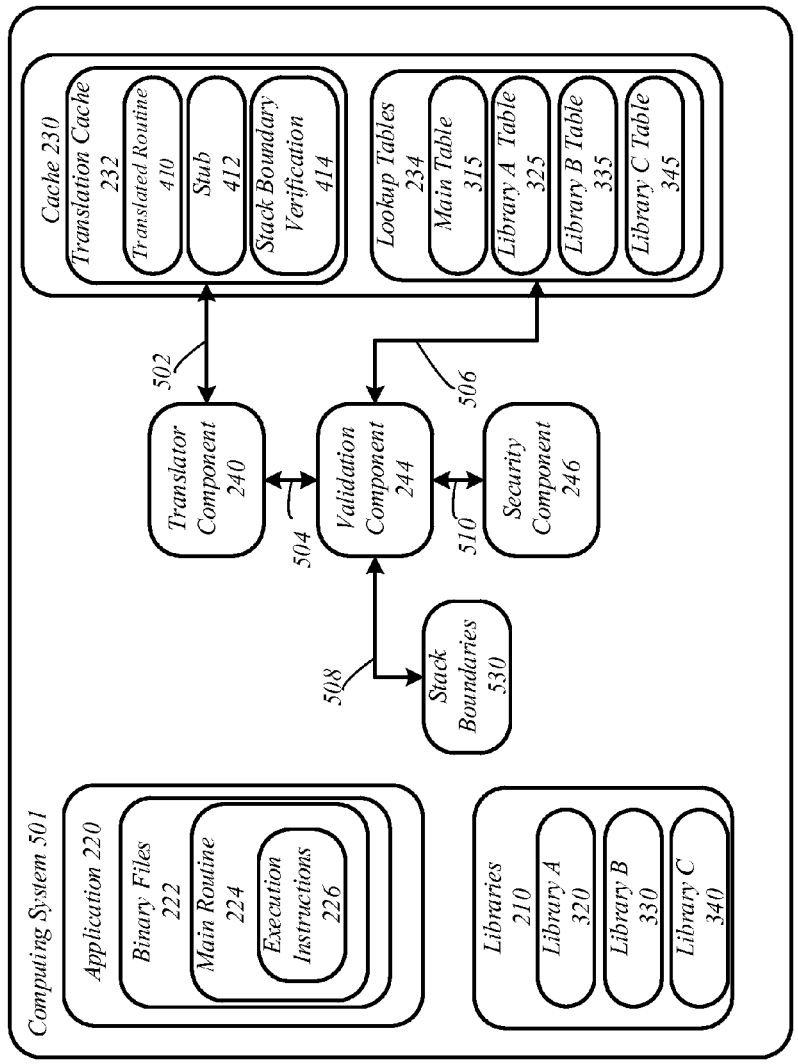
FIG. 5 illustrates an embodiment of a computing system for processing and validating a stack modification instruction.

FIG. 5 illustrates an embodiment of a computing system 501 which may process information, validate target addresses and validate stack modification instructions. In various embodiments, computing system 501 is the same as or similar to the computing systems of FIGS. 2, 3A-3E and 4.

In various embodiments, the translator component 240 may process any number of instructions stored in the translation cache 232 including, but not limited, branch instructions and stack modification instructions. For example, the translator component 240 may receive and intended target address for an indirect branch instruction when stub instruction 412 is executed at line 502. At line 504, the translator component 240 may send information including the intended target address to a validation component 244 to validate the address. At line 506, the validation component 244 may validate the intended target address by comparing it with known valid target addresses. If the intended target address is invalid, the validation component 244 may send information to a security component 246 to initiate a security measure. However, if the intended target address is valid, the instruction is allowed to proceed or be executed.

Similarly, the translator component 240 may also process stack boundary verification instructions 414. At line 502, the translator component 240 may receive information based on a stack boundary verification instruction 414 executing. As mentioned, during a translation routine, the translator component 240 may embed a stack boundary verification instruction 414 after each stack modification instruction translated and stored in the translation cache 232. The stack boundary verification 414 is used during execution to validate the stack modification instruction and ensure that the stack modification instruction does not include a value or pointer outside determined valid stack boundaries. The translator component 240 may receive information including a value or a pointer to a location where a stack modification instruction wants to change to. The translator component 240 may send the value or pointer at line 504 to the validation component 244 to validate. At line 508, the validation component 244 may validate the value or pointer for a stack modification instruction based on whether the value or pointer is within determined valid stack boundaries 530. The determined valid stack boundaries 530 may be defined when a stack is initialized by an operating system and may be stored in memory, and in some instances, in cache. If the value is within determined valid stack boundaries 530, the stack modification instruction may be allowed to proceed. However, if the value is not within determined valid stack boundaries 530, the validation component 244 may send information at line 510 to initiate a security measure to prevent a malware attack. Various embodiments are not limited in this manner.

Figure 6:
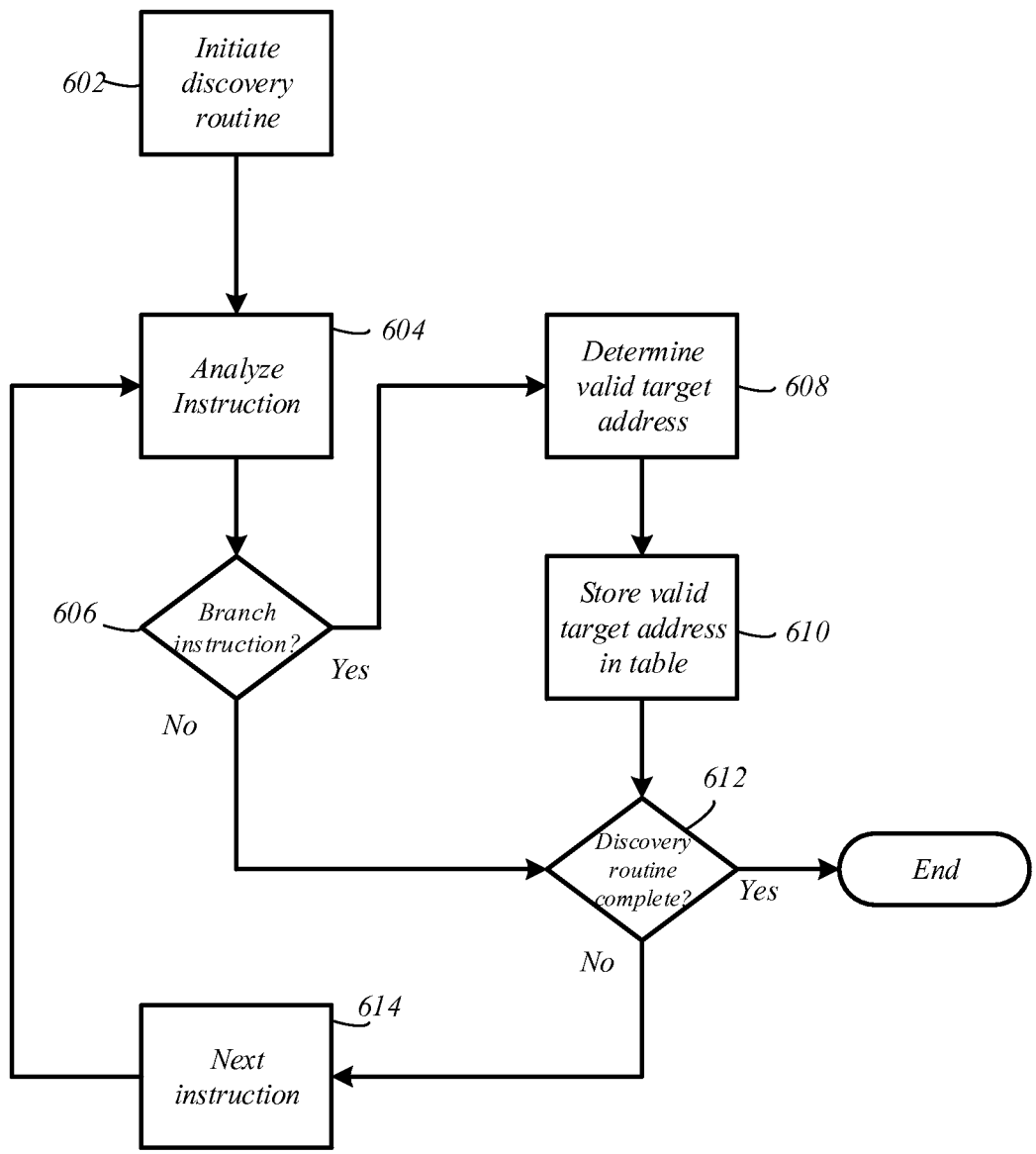
FIG. 6 illustrates an embodiment of a logic flow diagram for processing a discovery routine.

FIG. 6 illustrates an embodiment of a logic flow diagram 600 for processing a discovery routine. In various embodiments, the discovery routine may be processed by one or more components of a computing system, such as a discovery component 242 which may be implemented in hardware only, software only, or combination thereof. The discovery routine can be used by a computing system to determine valid target addresses for branch instructions of an application by reading information in the binary files of the application and associated libraries.

At block 602, the discovery routine may be initialized or invoked by any number of events. For example, a user may initiate the discovery routine via one or more inputs received by an input device. In another example, the discovery routine may be initialized by a software agent or anti-virus program on a periodic or semi-periodic basis. In some embodiments, the software agent may initiated the discovery routine when a program is loaded on a computing system. Various embodiments are not limited in this manner and a discovery routine may execute at any time.

In embodiments, an instruction may be analyzed at block 604 to determine whether it is an instruction having a target address, such as a branch instruction. At block 606, the determination may be made as to whether the instruction is a branch instruction or not a branch instruction. If the instruction is not a branch instruction, a determination may be made as to whether additional instructions need to be analyzed at block 612.

However, if the instruction is a branch instruction at block 606, the discovery routine may determine a valid target address for the instruction at block 608. The discovery routine may look at one or more tables, such as a relocation table or a linkage table to determine a valid target address for the instruction. In some embodiments, each binary file may be associated with a particular relocation table and/or linkage table. In these embodiments, the discovery routine may look in the particular relocation table and/or linkage associated with the binary file in which the instruction is located in to determine a valid target address. However, in the same or other embodiments only a single relocation table and a single linkage table may exist and the discovery routine may determine a valid target addresses from these tables. Various embodiments are not limited in this manner.

Moreover and in one example, the discovery routine may exploit the relocation information stored in a relocation table used by an operating system to relocate an instruction to a virtual address to determine a valid target address. More specifically, a relocation table may include a pointer for addresses and offsets of targets of branch instructions and data structures used by an operating system loader to relocate the instruction to a virtual address. These pointers in the relocation table may be used by the discovery routine to predict valid target addresses for a branch.

In another example, the discovery routine may exploit linkage information in a linkage table. A linkage table may store information used to export and import dynamic-link library (DLL) address information to perform dynamic linking of a library. This linkage information may be used by the discovery routine to determine or predict target addresses for calls made to external DLL APIs.

Once a valid target address is determined, the discovery routine may store the valid target address in a table at block 610. The table may be a fast lookup table that is stored in cache memory and that can be quickly accessed during execution of instructions to validate target addresses. In some embodiments, each binary file, library and routine may be associated with a particular fast lookup table and at block 610 the discovery routine may be store the valid target address in a particular lookup associated with the routine, library, or file in which the instruction is stored in.

At block 612, a determination is made as to whether the analysis is complete for the application and associated libraries. As mentioned, each binary file for an application and each library associated or used by the application may be analyzed to during the discovery routine to determine valid target addresses. If all of the instructions in the files and libraries have not be analyzed, logic flow 600 proceeds to the next instruction at block 614 and is repeated. However, if the analysis is done, the discovery routine is complete and exits and/or a translation routine is executed.

Figure 7:
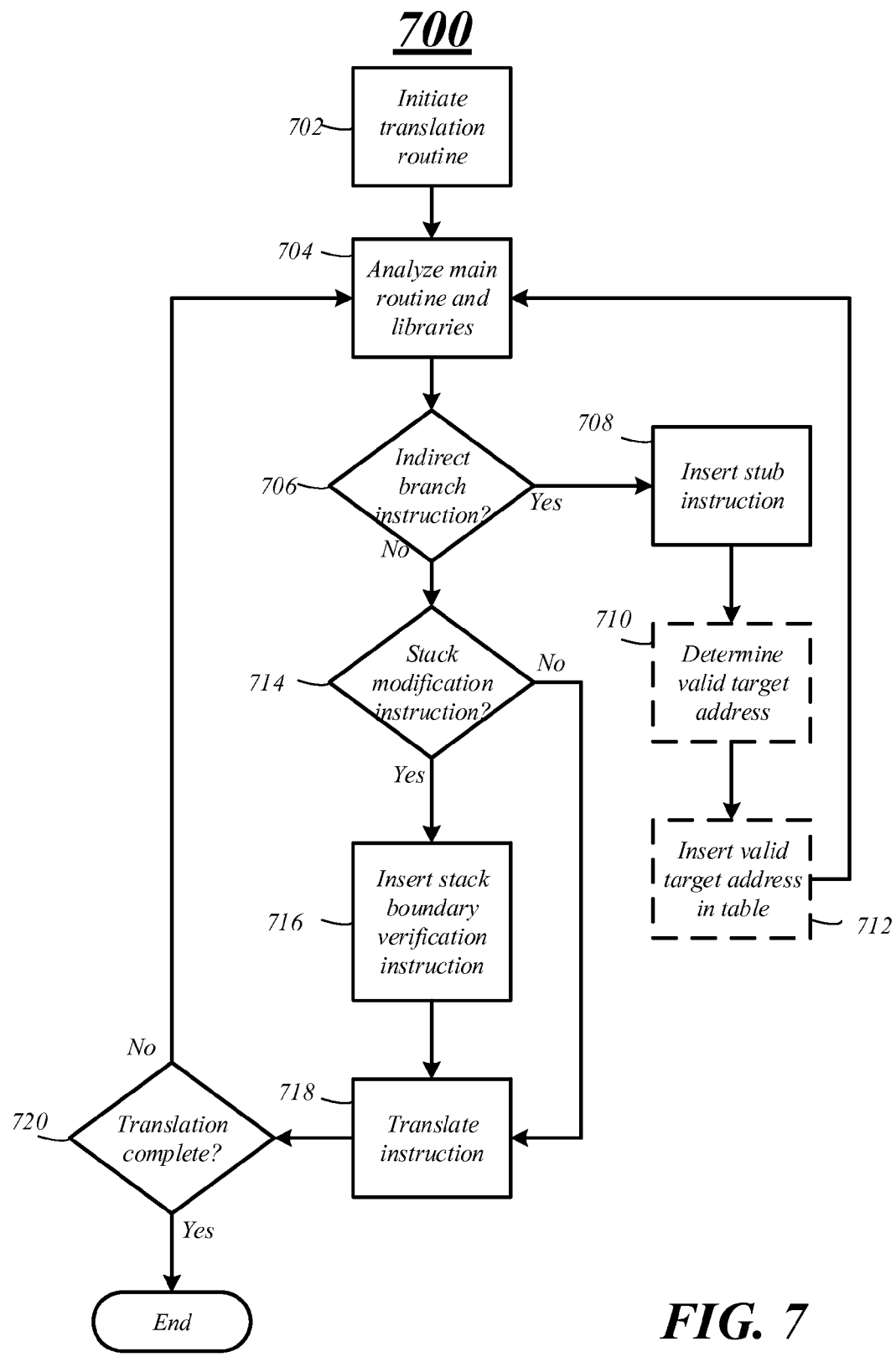
FIG. 7 illustrates an embodiment of a logic flow diagram for processing a translation routine.

FIG. 7 illustrates an embodiment of a logic flow 700 to process a translation routine. In various embodiments, the translation routine may be processed by one or more components of a computing system, such as a translator component 240 which may be implemented in hardware only, software only, or combination thereof. The translation routine can be used by a computing system to determine translate instructions for one or more application, determine valid target addresses, and control the flow of execution of the application.

At block 702, a translation routine may be initiated. In various embodiments the translation routine may be initiated based on a user interaction via a user interface, for example. In another example, a translation routine can also be initiated by a component of a computing system when an application is executed. More specifically, when an application is executed on a computing system, a software agent or anti-virus software may initiate the translation routine to protect against attacks. The translation routine may execute dynamically, while an application is executing, or prior to the execution of the application. When the translation routine is occurring dynamically, portions of one or more routines may be translated in real-time, and in some instances on an as needed basis. For example, only portions of the application executed are translated. Various embodiments are not limited in this manner and some instances an application and supporting libraries may be translated.

At block 704, binary files and libraries are analyzed. More specifically, each of the instructions in binary files for the application and associated libraries may be analyzed to determine a type for the instructions. For example, the instructions may include branch instruction, stack modification instruction, an arithmetic instruction, a control instruction, a data handling instruction, and so forth. In some embodiments, the instructions may be complex instructions which may perform a number of "steps" to process data and information.

The logic flow 700 may determine whether an instruction is an indirection branch instruction at block 706. If an instruction is an indirect branch instruction, the translation routine inserts a stub function in translated cache at block 708 to return control to a translator component during execution of the instruction. The stub instruction may replace the original indirect branch instruction to direct the process flow of execution to the translator component so that a comparison can be made to validate a target address for the instruction. At blocks 710 and 712, a valid target address may be determined and stored in a table for the indirect branch instruction if a valid target address has not already been determined. In some embodiments, a valid target address is already determined for the indirect branch instruction and stored in a table during a discovery routine, for example.

If at block 706, the instruction is not an indirect branch instruction a determination is made at decision block 714 as to whether the instruction is a stack modification instruction. If the instruction is not a stack modification instruction, the logic flow continues to block 718 and the instruction is translated and stored in translation caches. The translated instructions stored in translation cache may be executed during execution of an application.

At block 716, a stack boundary verification instruction may be generated and stored after the stack modification instruction in the translation cache when the instruction is a stack modification instruction. In some embodiments, a more coarse grain approach may be implemented as determined by a software agent. In these embodiments, a stack boundary verification instruction may be inserted after a basic block boundary, or after particular branch instructions. In embodiments, the stack boundary verification instruction may only be placed after stack boundary modification instructions that call particular addresses. Various embodiments are not limited in this manner and the logic flow may then proceed to block 718 and the stack modification may be translated.

At decision block 720, a determination is made as to whether the translation is complete. For example, execution of an application may cease also ending the translation routine. However, if the translation is not complete, logic flow 700 may be repeated any number of times to translate any number of instructions for an application.

Figure 8:
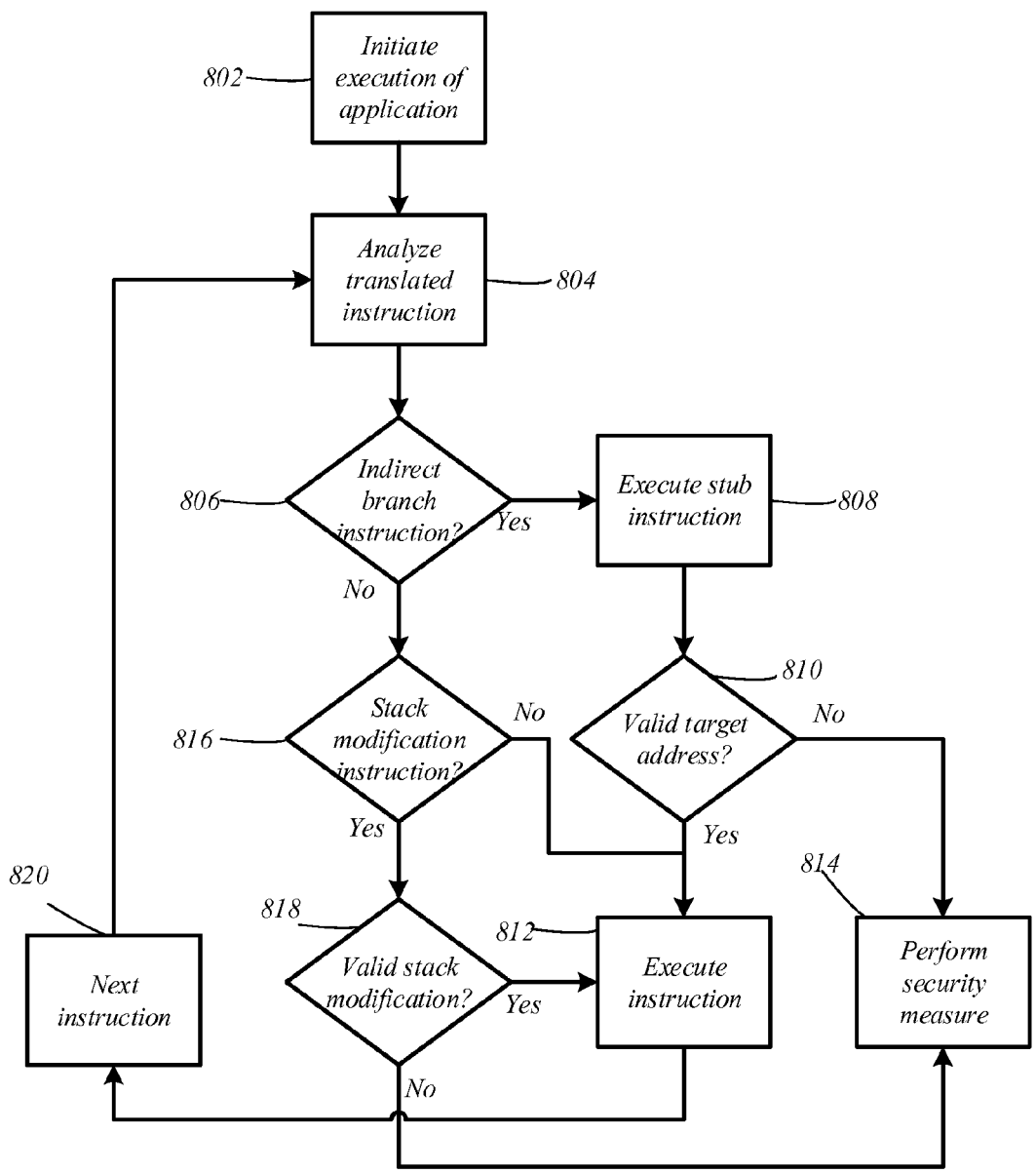
FIG. 8 illustrates an embodiment of a logic flow diagram for processing an application.

FIG. 8 illustrates an embodiment of a logic flow 800 for processing an application. In various embodiments, an application execution may be processed by one or more components of a computing system, including processing circuitry. In some embodiments, the one or more components may be implemented in hardware only, software only, or combination thereof.

In various embodiments, an application may be executed at block 802. The application may be executed based on information received via a user input or automatically based on some other trigger event, for example. When the application is executing a number of instructions may be executed such that certain results occur in accordance with the application. As previously discussed, the instructions may include any number of different types of instructions which may cause different actions to occur on a computing system.

Each instruction may be a translated instruction for the application or associated library and may be executed from cache, such as translation cache at block 804. Further and also at block 804, each instruction may be analyzed to determine whether it is an indirect branch instruction based on the presence of a stub instruction or a stack boundary verification instruction. If the instruction is an indirect branch instruction at block 806 the stub instruction substitute for the indirect branch instruction may be executed at block 808. When the stub instruction is executed, an intended target address may be passed to a validation component and may be validated against information in a fast lookup table at decision block 810.

If the intended target address is invalid, a security measure will be initiated block 814. As previously discussed any number of security measures may be initiated, including halting the execution of the application and reporting the possible attack to a security agent or anti-virus program. Further and if the intended target address is valid at block 810, the instruction may be permitted to execute at block 812.

If the instruction is not a branch instruction, and in particular an indirect branch instruction at block 806, a determination may be made as to whether the instruction is a stack modification instruction at decision block 816. If not, the instruction may be executed at block 812 as the instruction is not one typically used in a ROP attack, JOP attack, stack pivot attack, etc. However, if the instruction is a stack modification instruction, a determination is made as to whether the stack modification instruction modifies a stack pointer within predetermined valid boundaries at block 818. If so, the stack modification instruction is permitted to execute at bock 812. However, if the stack modification instruction modifies a pointer outside the valid stack boundary, a security measure may be initiated at block 814.

This process may be repeated for any number of instruction and until the application ceases execution. For example, at block 820 the next instruction is determined and sent for analysis. Although certain actions as shown as occurring a certain order various embodiments are limited in this manner.

Figure 9:
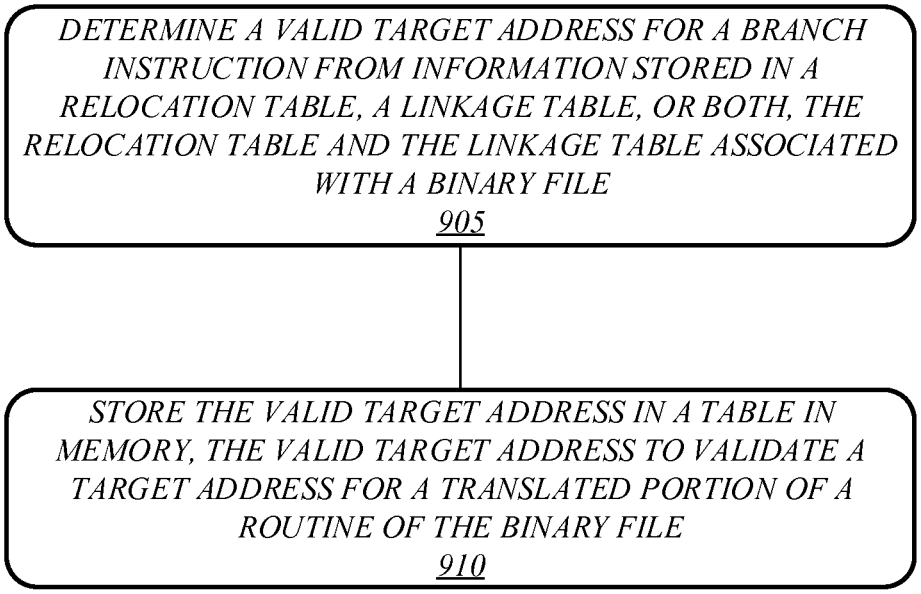
FIG. 9 illustrates an embodiment of a logic flow diagram.

FIG. 9 illustrates an embodiment of a logic flow 900. The logic flow 900 may be representative of some or all of the operations executed by one or more embodiments described herein. For example, the logic flow 900 may illustrate operations performed by one or more of the computing systems of FIGS. 1-5. In the illustrated embodiment shown in FIG. 9, the logic flow 900 at block 905 may include determining a valid target address for a branch instruction from information stored in a relocation table, a linkage table, or both, the relocation table and the linkage table associated with a binary file. The valid target address may be determined during a discovery routine by reading information stored in the relocation table and/or linkage table stored in storage prior to execution and translation of the binary files. As mentioned, the relocation table and the linkage table may include information that may be exploited by the discovery routine to determine a target address for an instruction addressed to a particular area in a memory, e.g. a branch instruction.

In some embodiments, a valid target address may be determined for each branch instruction in one or binary files of an application and one or more binary files of libraries used by the application during execution of the application. In addition, each of the binary files may include separate or different relocation tables and linkage tables and the valid target address may be determined from information in the relocation table and/or linkage table corresponding with the binary file having the branch instruction. However, some embodiments are not limited in this manner and in some embodiments a single relocation table and a single linkage table may be used by all of the binary files.

The logic flow 900 may also include storing the valid target address in a table in memory, the valid target address to validate a target address for a translated portion of a routine of the binary file at block 910. In some embodiments, the discovery routine may store the valid target in a fast lookup table stored in cache such that an intended target address may be validated during execution of translated instructions. In addition, each binary file of an application and each binary file of associated libraries may include a separate fast lookup table in memory. Thus, valid target addresses may be stored in a lookup table associated with the binary file having the instruction for which the valid target address is determined for. Various embodiments are not limited in this manner and in some embodiments one lookup table may be used to store all of the valid target address or any number of lookup tables may be used.

FIG. 10 illustrates an embodiment of a logic flow 1000. The logic flow 1000 may be representative of some or all of the operations executed by one or more embodiments described herein. For example, the logic flow 1000 may illustrate operations performed by one or more of the computing systems of FIGS. 1-5. In the illustrated embodiment shown in FIG. 10, the logic flow 1000 may include translating a portion of a routine into a translated portion of the routine at block 1005. More specifically, one or more binary files for an application and libraries used by the application during execution may be translated and stored in a translation cache in memory during a translation routine. The translation routine may occur dynamically, while the application is executing or prior to the execution of the application. Further and during the translation of the binary files, one or more instructions may be analyzed and stored in the translation cache. As previously mentioned, valid target addresses may be determine the translation routine as well as during the discovery routine which may also be stored in one or more lookup tables.

In some embodiments, the logic flow 1000 may also include determining whether an instruction of the routine is a stack modification instruction at block 1010. The determination may be made by a translator component during the translation routine based on the instruction. For example, the translator component may determine that an instruction is a stack modification instruction if it includes a pointer or value to change a location to which a stack pointer is pointing to. In another example, the translator component may also determine whether an instruction is a stack modification instruction based on the type of instruction, such as an exchange (XCHG) instruction, a pop (POP) instruction, a leave instruction, a move (MOV) instruction, and so forth. Various embodiments are not limited to these instructions.

The logic flow 1000 may also include embedding a stack boundary verification instruction after the stack modification instruction in the translated portion of the routine at block 1015. Once a determination is made as to whether an instruction is a stack modification instruction, the translation routine may insert or embed another instruction after the stack modification instruction in the translated routine. This embedded stack boundary verification instruction may be used during execution of the application to check if the stack modification instruction modifies the stack pointer within predetermined valid stack boundaries. For example, a validation component may receive information including a value in which the stack modification wants to change the stack pointer to. The validation component may validate value based on known valid stack boundaries stored in memory.

Figure 11:
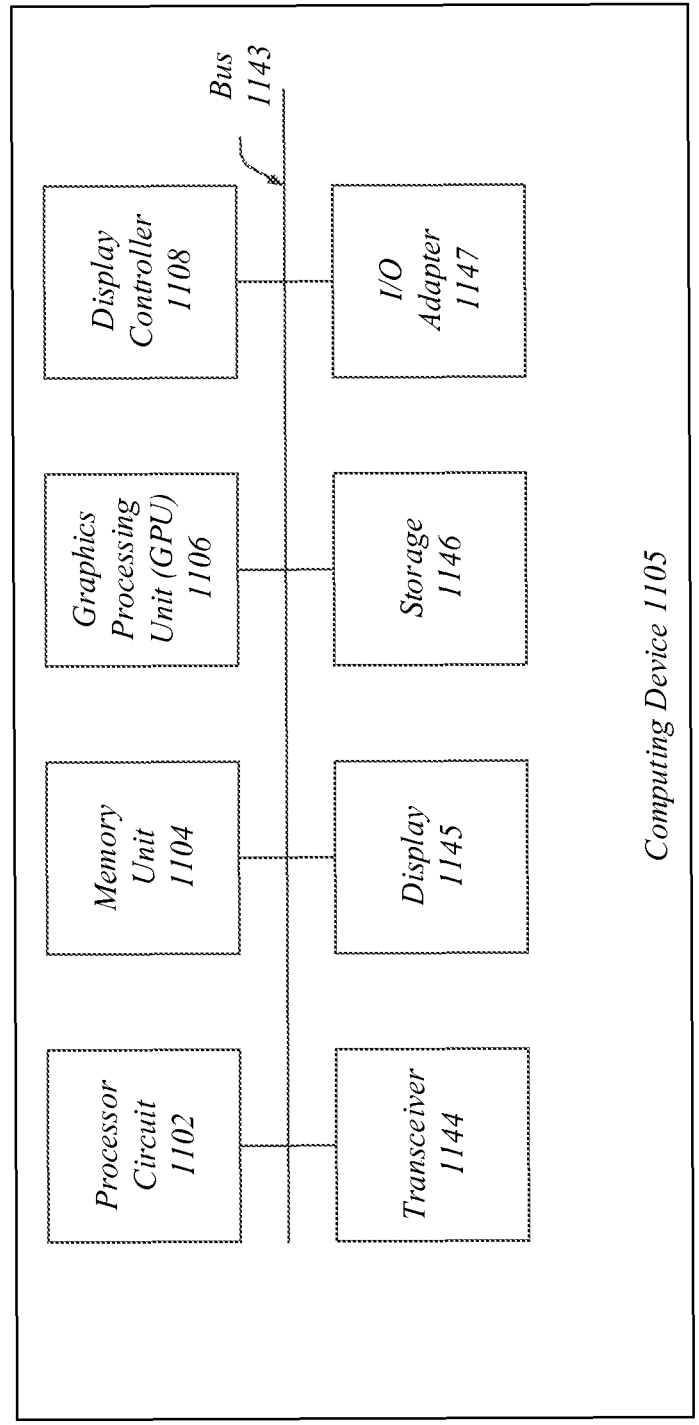
FIG. 11 illustrates an exemplary embodiment of a computing system.

FIG. 11 illustrates one embodiment of a system 1100. In various embodiments, system 1100 may be representative of a system or architecture suitable for use with one or more embodiments described herein, such as flow 100 of FIG. 1 and system 200 of FIG. 2. The embodiments are not limited in this respect.

As shown in FIG. 11, system 1100 may include multiple elements. One or more elements may be implemented using one or more circuits, components, registers, processors, software subroutines, modules, or any combination thereof, as desired for a given set of design or performance constraints. Although FIG. 11 shows a limited number of elements in a certain topology by way of example, it can be appreciated that more or less elements in any suitable topology may be used in system 1100 as desired for a given implementation. The embodiments are not limited in this context.

In various embodiments, system 1100 may include a computing device 1105 which may be any type of computer or processing device including a personal computer, desktop computer, tablet computer, netbook computer, notebook computer, laptop computer, server, server farm, blade server, or any other type of server, and so forth.

Other examples of computing device 1105 also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a computing device 1105 may be implemented as a smart phone capable of executing computer applications, as well as voice communications and/or data communications. Although some embodiments may be described with a computing device 1105 implemented as a smart phone by way of example, it may be appreciated that other embodiments may be implemented using other wireless computing devices as well. The embodiments are not limited in this context.

In various embodiments, computing device 1105 may include processor circuit 1102. Processor circuit 1102 may be implemented using any processor or logic device. The processing circuit 1102 may be one or more of any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit. The processing circuit 1102 may be connected to and communicate with the other elements of the computing system via an interconnect 1143, such as one or more buses, control lines, and data lines.

In one embodiment, computing device 1105 may include a memory unit 1104 to couple to processor circuit 1102. Memory unit 1104 may be coupled to processor circuit 1102 via communications bus 1143, or by a dedicated communications bus between processor circuit 1102 and memory unit 1104, as desired for a given implementation. Memory unit 04 may be implemented using any machine-readable or computer-readable media capable of storing data, including both volatile and non-volatile memory. In some embodiments, the machine-readable or computer-readable medium may include a non-transitory medium. The embodiments are not limited in this context.

Computing device 1105 may include a graphics processing unit (GPU) 1106, in various embodiments. The GPU 1106 may include any processing unit, logic or circuitry optimized to perform graphics-related operations as well as the video decoder engines and the frame correlation engines. The GPU 1106 may be used to render 2-dimensional (2-D) and/or 3-dimensional (3-D) images for various applications such as video games, graphics, computer-aided design (CAD), simulation and visualization tools, imaging, etc. Various embodiments are not limited in this manner; GPU 1106 may process any type of graphics data such as pictures, videos, programs, animation, 3D, 2D, objects images and so forth.

In some embodiments, computing device 1105 may include a display controller 1108. Display controller 1108 may be any type of processor, controller, circuit, logic, and so forth for processing graphics information and displaying the graphics information. The display controller 1108 may receive or retrieve graphics information from one or more buffers, such as buffer(s) 220. After processing the information, the display controller 1108 may send the graphics information to a display.

In various embodiments, system 1100 may include a transceiver 1144. Transceiver 1144 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, transceiver 1144 may operate in accordance with one or more applicable standards in any version. The embodiments are not limited in this context.

In various embodiments, computing device 1105 may include a display 1145. Display 1145 may constitute any display device capable of displaying information received from processor circuit 1102, graphics processing unit 1106 and display controller 1108.

In various embodiments, computing device 1105 may include storage 1146. Storage 1146 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 1146 may include technology to increase the storage performance enhanced protection for valuable digital media when multiple hard drives are included, for example. Further examples of storage 1146 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

In various embodiments, computing device 1105 may include one or more I/O adapters 1147. Examples of I/O adapters 1147 may include Universal Serial Bus (USB) ports/adapters, IEEE 1394 Firewire ports/adapters, and so forth. The embodiments are not limited in this context.

Figure 12:
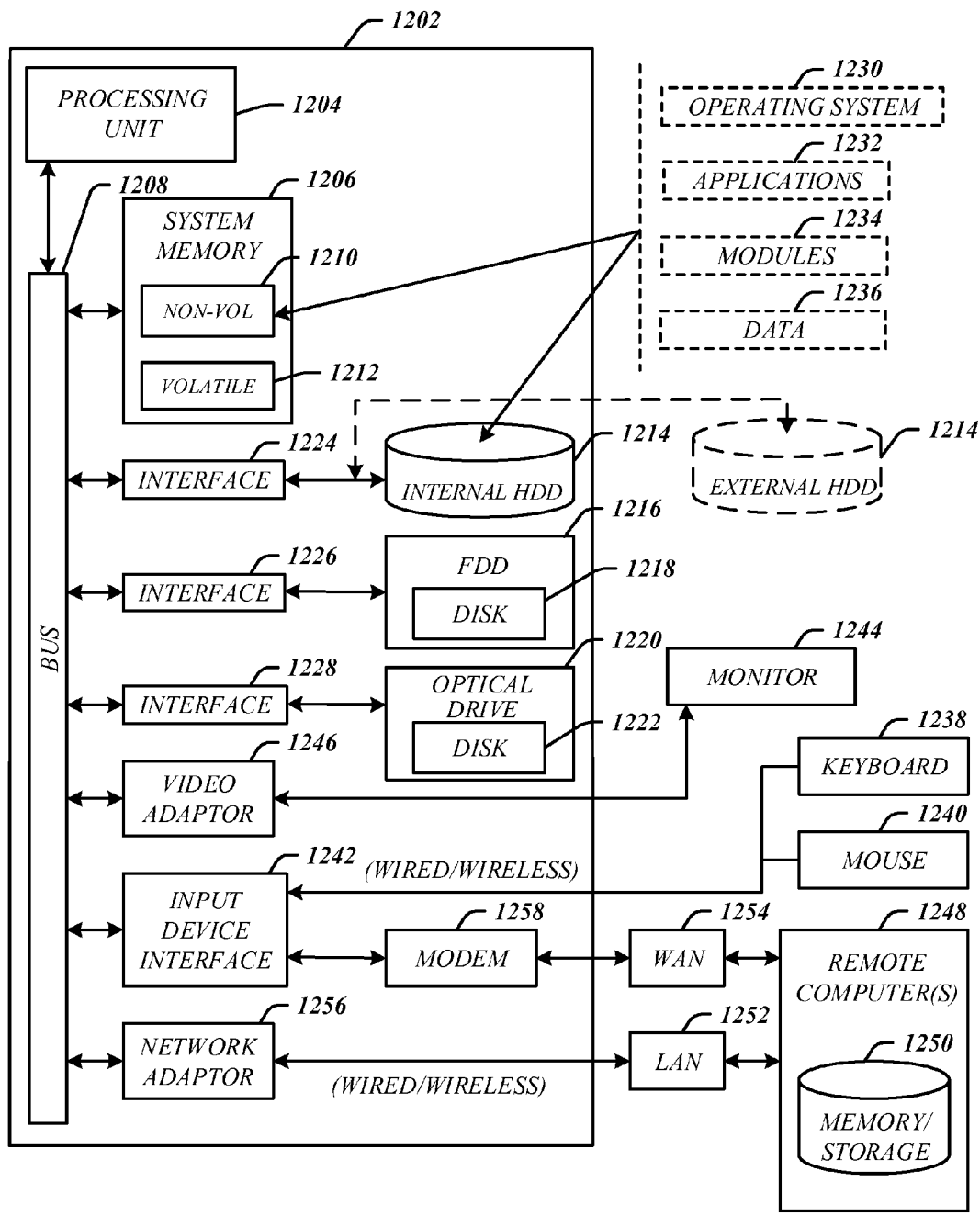
FIG. 12 illustrates an exemplary embodiment of a computing architecture.

FIG. 12 illustrates an embodiment of an exemplary computing architecture 1200 suitable for implementing various embodiments as previously described. In one embodiment, the computing architecture 1200 may include or be implemented as part of system 200.

As used in this application, the terms "system" and "component" are intended to refer to a computer-related entity, either hardware, a combination of hardware and software, software, or software in execution, examples of which are provided by the exemplary computing architecture 1200. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1200 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1200.

As shown in FIG. 12, the computing architecture 1200 includes a processing unit 1204, a system memory 1206 and a system bus 1208. The processing unit 1204 can be any of various commercially available processors.

The system bus 1208 provides an interface for system components including, but not limited to, the system memory 1206 to the processing unit 1204. The system bus 1208 can be any of several types of bus structure that may further interconnect to a memory bus (with or without a memory controller), a peripheral bus, and a local bus using any of a variety of commercially available bus architectures. Interface adapters may connect to the system bus 1208 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1200 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1206 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 12, the system memory 1206 can include non-volatile memory 1210 and/or volatile memory 1212. A basic input/output system (BIOS) can be stored in the non-volatile memory 1210.

The computer 1202 may include various types of computer-readable storage media in the form of one or more lower speed memory units, including an internal (or external) hard disk drive (HDD) 1214, a magnetic floppy disk drive (FDD) 1216 to read from or write to a removable magnetic disk 1218, and an optical disk drive 1220 to read from or write to a removable optical disk 1222 (e.g., a CD-ROM or DVD). The HDD 1214, FDD 1216 and optical disk drive 1220 can be connected to the system bus 1208 by a HDD interface 1224, an FDD interface 1226 and an optical drive interface 1228, respectively. The HDD interface 1224 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1210, 1212, including an operating system 1230, one or more application programs 1232, other program modules 1234, and program data 1236. In one embodiment, the one or more application programs 1232, other program modules 1234, and program data 1236 can include, for example, the various applications and/or components of the system 200.

A user can enter commands and information into the computer 1202 through one or more wire/wireless input devices, for example, a keyboard 1238 and a pointing device, such as a mouse 1240. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processing unit 1204 through an input device interface 1242 that is coupled to the system bus 1208, but can be connected by other interfaces such as a parallel port, IEEE 1394 serial port, a game port, a USB port, an IR interface, and so forth.

A monitor 1244 or other type of display device is also connected to the system bus 1208 via an interface, such as a video adaptor 1246. The monitor 1244 may be internal or external to the computer 1202. In addition to the monitor 1244, a computer typically includes other peripheral output devices, such as speakers, printers, and so forth.

The computer 1202 may operate in a networked environment using logical connections via wire and/or wireless communications to one or more remote computers, such as a remote computer 1248. The remote computer 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wire/wireless connectivity to a local area network (LAN) 1252 and/or larger networks, for example, a wide area network (WAN) 1254. Such LAN and WAN networking environments are commonplace in offices and companies, and facilitate enterprise-wide computer networks, such as intranets, all of which may connect to a global communications network, for example, the Internet.

When used in a LAN networking environment, the computer 1202 is connected to the LAN 1252 through a wire and/or wireless communication network interface or adaptor 1256. The adaptor 1256 can facilitate wire and/or wireless communications to the LAN 1252, which may also include a wireless access point disposed thereon for communicating with the wireless functionality of the adaptor 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wire and/or wireless device, connects to the system bus 1208 via the input device interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with wire and wireless devices or entities using the IEEE 1202 family of standards, such as wireless devices operatively disposed in wireless communication (e.g., IEEE 1202.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 1202.11x (a, b, g, n, etc.) to provide secure, reliable, fast wireless connectivity. A Wi-Fi network can be used to connect computers to each other, to the Internet, and to wire networks (which use IEEE 1202.3-related media and functions).

The various elements of the systems 100, 200, 1100 and 1200 as previously described with reference to FIGS. 1-12 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The detailed disclosure now turns to providing examples that pertain to further embodiments. Examples one through twenty-nine (1-29) provided below are intended to be exemplary and non-limiting.

In a first example, an article comprising a non-transitory computer-readable storage medium comprising a plurality of instructions that when executed enable processing circuitry to determine a valid target address for a branch instruction from information stored in a relocation table, a linkage table, or both, the relocation table and the linkage table associated with a binary file, and store the valid target address in a table in memory, the valid target address to validate a target address for a translated portion of a routine of the binary file.

In a second example and in furtherance of the first example, an article may include the information including relocation information in the relocation table, the relocation information further comprising a pointer for the valid target address.

In a third example and in furtherance of any of the previous examples, an article may include the information having linkage information in the linkage table, the linkage information further comprising export address information for the valid target address or import address information for the valid target address.

In a fourth example and in furtherance of any of the previous examples, an article including the plurality of instructions that when executed enable processing circuitry to determine the valid target address prior to translating a portion of the routine into the translated portion.

In a fifth example and in furtherance of any of the previous examples, an article may include the plurality of instructions that when executed enable processing circuitry to determine the valid target address prior to execution of the translated portion of the routine.

In a sixth example and in furtherance of any of the previous examples, an article may include the plurality of instructions that when executed enable processing circuitry to translate a portion of the routine into the translated portion and store the translated portion in a translation cache.

In a seventh example and in furtherance of any of the previous examples, an article may include the plurality of instructions that when executed enable processing circuitry to determine a plurality of valid target addresses each for a different branch instruction from one of a plurality of binary files, each of the plurality of binary files is associated with a different table to store valid target addresses.

In an eighth example and in furtherance of any of the previous examples, an article may include the plurality of instructions that when executed enable processing circuitry to translate a portion of the routine into the translated portion of the routine, determine whether an instruction of the routine is a stack modification instruction and embed a stack boundary verification instruction after the stack modification instruction in the translated portion of the routine.

In a ninth example and in furtherance of any of the previous examples, an article may include the plurality of instructions that when executed enable processing circuitry to validate a stack modification instruction based on whether a value of the stack modification instruction is within determined boundaries and initiate a security measure to prevent a security breach if a value of the stack modification instruction is not within the determined boundaries In a tenth example and in furtherance of any of the previous examples, a system, device, or an apparatus may include a network interface, a memory, processing circuitry, storage and a discovery component operable on the processing circuitry to determine a valid target address for a branch instruction from information in a relocation table or a linkage table stored in the persistent storage, the relocation table and the linkage table associated with a binary file, and store the valid target address in a table in the memory, the valid target address to validate a target address for a translated portion of a routine of the binary file.

In an eleventh example and in furtherance of any of the previous examples, a system, device, or an apparatus may include the information having relocation information in the relocation table stored in the storage, the relocation information further comprising a pointer for the valid target address.

In a twelfth example and in furtherance of any of the previous examples, a system, device, or an apparatus may include the information having linkage information in the linkage table stored in storage, the linkage information further comprising export address information for the valid target address or import address information for the valid target address.

In a thirteenth example and in furtherance of any of the previous examples, a system, device, or an apparatus may include the discovery component to determine the valid target address prior to translating a portion of the routine into the translated portion.

In a fourteenth example and in furtherance of any of the previous examples, a system, device, or an apparatus may include the discovery component to determine the valid target address prior to execution of the translated portion of the routine by the processing circuitry.

In a fifteenth example and in furtherance of any of the previous examples, a system, device, or an apparatus may include a translator component operable on the processing circuitry to translate a portion of the routine into the translated portion and store the translated portion in a translation cache in the memory.

In a sixteenth example and in furtherance of any of the previous examples, a system, device, or an apparatus may include the discovery component to determine a plurality of valid target addresses each for a different branch instruction from one of a plurality of binary files, each of the binary files is associated with a different table to store valid target addresses.

In a seventeenth example and in furtherance of any of the previous examples, a system, device, or an apparatus may include a translator component operable on the processing circuitry to translate a portion of the routine into the translated portion of the routine, determine whether an instruction of the routine is a stack modification instruction, and embed a stack boundary verification instruction after the stack modification instruction in the translated portion of the routine.

In an eighteenth example and in furtherance of any of the previous examples, a system, device, or an apparatus may include a validation component operable on the processing circuitry to validate a stack modification instruction based on whether a value of the stack modification instruction is within determined boundaries, and a security component operable on the processing circuitry to initiate a security measure to prevent a security breach if the value of the stack modification instruction is not within determined boundaries.

In an nineteenth example and in furtherance of any of the previous examples, a system, device, or an apparatus may include wherein storage further comprises one of a hard drive, solid state drive, or a hybrid hard drive.

In a twentieth example and in furtherance of any of the previous examples, an article may include the plurality of instructions that when executed enable processing circuitry to translate a portion of a routine into a translated portion of the routine, determine whether an instruction of the routine is a stack modification instruction, and embed a stack boundary verification instruction after the stack modification instruction in the translated portion of the routine.

In a twenty-first example and in furtherance of any of the previous examples, an article may include the plurality of instructions that when executed enable processing circuitry to validate the stack modification instruction based on whether a value of the stack modification instruction is within determined boundaries.

In a twenty-second example and in furtherance of any of the previous examples, an article may include the plurality of instructions that when executed enable processing circuitry to initiate a security measure to prevent a security breach if a value of the stack modification instruction is not within determined boundaries.

In a twenty-third example and in furtherance of any of the previous examples, an article may include the plurality of instructions that when executed enable processing circuitry to embed a stack boundary verification instruction after a basic block boundary.

In a twenty-fourth example and in furtherance of any of the previous examples, a system, device, or an apparatus may include processing circuitry, a translator component operable on the processing circuitry to translate a portion of a routine into a translated portion of the routine, determine whether an instruction of the routine is a stack modification instruction, and embed a stack boundary verification instruction after the stack modification instruction in the translated portion of the routine.

In a twenty-fifth example and in furtherance of any of the previous examples, a system, device, or an apparatus may include a validation component operable on the processing circuitry to validate a stack modification instruction based on whether a value of the stack modification instruction is within determined boundaries.

In a twenty-sixth example and in furtherance of any of the previous examples, a system, device, or an apparatus may include a security component operable on the processing circuitry to initiate a security measure to prevent a security breach if a value of the stack modification instruction is not within determined boundaries.

In a twenty-seventh example and in furtherance of any of the previous examples, a system, device, or an apparatus may include the translator component to embed a stack boundary verification instruction after a basic block boundary.

In a twenty-eighth example and in furtherance of any of the previous examples, various embodiments may include a computer-implemented method to perform any of the previous examples including examples one through nineteen.

In a twenty-ninth example and in furtherance of any of the previous examples, various embodiments may include a computer-implemented method to perform any of the previous examples including examples twenty through twenty-seven.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An article comprising a non-transitory computer-readable storage medium comprising a plurality of instructions that when executed enable processing circuitry to:
determine a valid target address for a branch instruction from information stored in a relocation table, a linkage table, or both, the relocation table and the linkage table associated with a binary file, the relocation table including one or more pointers for one or more target addresses to enable relocation of one or more branch instructions to one or more virtual addresses, the determination of the valid target address for the branch instruction based on at least one of the one or more pointers; and
store the valid target address in a table in memory, the valid target address to validate a target address for a translated portion of a routine of the binary file.

2. The non-transitory computer-readable storage medium of claim 1, wherein the information comprises relocation information in the relocation table, the relocation information further comprising a pointer for the valid target address.

3. The non-transitory computer-readable storage medium of claim 1, wherein the information comprises linkage information in the linkage table, the linkage information further comprising export address information for the valid target address or import address information for the valid target address.

4. The non-transitory computer-readable storage medium of claim 1, further comprising the plurality of instructions that when executed enable processing circuitry to determine the valid target address prior to translating a portion of the routine into the translated portion.

5. The non-transitory computer-readable storage medium of claim 1, further comprising the plurality of instructions that when executed enable processing circuitry to determine the valid target address prior to execution of the translated portion of the routine.

6. The non-transitory computer-readable storage medium of claim 1, further comprising the plurality of instructions that when executed enable processing circuitry to translate a portion of the routine into the translated portion and store the translated portion in a translation cache.

7. The non-transitory computer-readable storage medium of claim 1, further comprising the plurality of instructions that when executed enable processing circuitry to determine a plurality of valid target addresses each for a different branch instruction from one of a plurality of binary files, each of the plurality of binary files is associated with a different table to store valid target addresses.

8. The non-transitory computer-readable storage medium of claim 1, further comprising the plurality of instructions that when executed enable processing circuitry to translate a portion of the routine into the translated portion of the routine, determine whether an instruction of the routine is a stack modification instruction and embed a stack boundary verification instruction after the stack modification instruction in the translated portion of the routine.

9. The non-transitory computer-readable storage medium of claim 1, further comprising the plurality of instructions that when executed enable processing circuitry to validate a stack modification instruction based on whether a value of the stack modification instruction is within determined boundaries and initiate a security measure to prevent a security breach if a value of the stack modification instruction is not within the determined boundaries.

10. An apparatus, comprising:
a network interface;
a memory;
processing circuitry;
storage;
a discovery component operable on the processing circuitry to:
determine a valid target address for a branch instruction from information in a relocation table or a linkage table stored in the storage, the relocation table and the linkage table associated with a binary file, the relocation table including one or more pointers for one or more target addresses to enable relocation one or more branch instructions to one or more virtual addresses, the determination of the valid target address for the branch instruction based on at least one of the one or more pointers; and
store the valid target address in a table in the memory, the valid target address to validate a target address for a translated portion of a routine of the binary file.

11. The apparatus of claim 10, wherein the information comprises relocation information in the relocation table stored in the storage, the relocation information further comprising a pointer for the valid target address.

12. The apparatus of claim 10, wherein the information comprises linkage information in the linkage table stored in storage, the linkage information further comprising export address information for the valid target address or import address information for the valid target address.

13. The apparatus of claim 10, the discovery component to determine the valid target address prior to translating a portion of the routine into the translated portion.

14. The apparatus of claim 10, the discovery component to determine the valid target address prior to execution of the translated portion of the routine by the processing circuitry.

15. The apparatus of claim 10, comprising a translator component operable on the processing circuitry to translate a portion of the routine into the translated portion and store the translated portion in a translation cache in the memory.

16. The apparatus of claim 10, the discovery component to determine a plurality of valid target addresses each for a different branch instruction from one of a plurality of binary files, each of the binary files is associated with a different table to store valid target addresses.

17. The apparatus of claim 10, comprising a translator component operable on the processing circuitry to:
translate a portion of the routine into the translated portion of the routine,
determine whether an instruction of the routine is a stack modification instruction, and
embed a stack boundary verification instruction after the stack modification instruction in the translated portion of the routine.

18. The apparatus of claim 10, comprising:
a validation component operable on the processing circuitry to validate a stack modification instruction based on whether a value of the stack modification instruction is within determined boundaries; and
a security component operable on the processing circuitry to initiate a security measure to prevent a security breach if the value of the stack modification instruction is not within determined boundaries.

19. The apparatus of claim 10, wherein storage further comprises one of a hard drive, solid state drive, or a hybrid hard drive.

20. An article comprising a non-transitory computer-readable storage medium comprising a plurality of instructions that when executed enable processing circuitry to:
translate a portion of a routine into a translated portion of the routine;
determine an instruction of the routine is a stack modification instruction; and
embed a stack boundary verification instruction after the stack modification instruction in the translated portion of the routine based on the determination, the stack boundary verification instruction to initiate a check to determine whether the stack modification instruction directs flow of execution outside of valid stack boundaries for an application.

21. The non-transitory computer-readable storage medium of claim 20, further comprising the plurality of instructions that when executed enable processing circuitry to validate the stack modification instruction based on whether a value of the stack modification instruction is within determined boundaries.

22. The non-transitory computer-readable storage medium of claim 20, further comprising the plurality of instructions that when executed enable processing circuitry to initiate a security measure to prevent a security breach if a value of the stack modification instruction is not within determined boundaries.

23. The non-transitory computer-readable storage medium of claim 20, further comprising the plurality of instructions that when executed enable processing circuitry to embed a stack boundary verification instruction after a basic block boundary.

24. An apparatus, comprising:
processing circuitry;
a translator component operable on the processing circuitry to translate a portion of a routine into a translated portion of the routine, determine an instruction of the routine is a stack modification instruction, and embed a stack boundary verification instruction after the stack modification instruction in the translated portion of the routine based on the determination, the stack boundary verification instruction to initiate a check to determine whether the stack modification instruction directs flow of execution outside of valid stack boundaries for an application.

25. The apparatus of claim 24, comprising a validation component operable on the processing circuitry to validate a stack modification instruction based on whether a value of the stack modification instruction is within determined boundaries.

26. The apparatus of claim 24, comprising a security component operable on the processing circuitry to initiate a security measure to prevent a security breach if a value of the stack modification instruction is not within determined boundaries.

27. The apparatus of claim 24, the translator component to embed a stack boundary verification instruction after a basic block boundary.

* * * * *